US012749966B2

(12) United States Patent
Dahaki et al.

(10) Patent No.: US 12,749,966 B2
(45) **Date of Patent: *Sep. 29, 2026**

(54) NON-ISOLATED ZERO CURRENT AND VOLTAGE TRANSITION TECHNIQUE (ZCVTT)

(71) Applicant: Power Switching LLC, Torrance, CA (US)

(72) Inventors: Alen Dahaki, Torrance, CA (US); Farzad Ahmadkhanlou, Torrance, CA (US); Reza Sarhadi Nia, Torrance, CA (US)

(73) Assignee: Power Switching LLC, Torrance, CA (US)

(*) Notice: Subject to any disclaimer, the term of this patent is extended or adjusted under 35 U.S.C. 154(b) by 174 days.

This patent is subject to a terminal disclaimer.

(21) Appl. No.: 18/890,649

(22) Filed: Sep. 19, 2024

(65) Prior Publication Data

US 2025/0015710 A1 Jan. 9, 2025

Related U.S. Application Data

(63) Continuation of application No. 17/785,039, filed as application No. PCT/US2022/032451 on Jun. 7, 2022, now Pat. No. 12,126,254.

(60) Provisional application No. 63/197,890, filed on Jun. 7, 2021.

(51) Int. Cl.

| | |
|---|---|
| ***H02M 1/34*** | (2007.01) |
| ***H02M 1/00*** | (2006.01) |
| ***H02M 3/158*** | (2006.01) |
| ***H02M 7/217*** | (2006.01) |
| ***H02M 7/5387*** | (2007.01) |

(52) U.S. Cl.

CPC ........... *H02M 1/34* (2013.01); *H02M 1/0058* (2021.05); *H02M 1/342* (2021.05); *H02M 1/346* (2021.05); *H02M 3/158* (2013.01); *H02M 7/217* (2013.01); *H02M 7/5387* (2013.01)

(58) Field of Classification Search

CPC .. H02M 1/0058; H02M 7/5387; H02M 1/342; H02M 1/346; H02M 7/797; H02M 1/08; H02M 3/155; H02M 7/12; H02M 7/53

See application file for complete search history.

(56) References Cited

U.S. PATENT DOCUMENTS

| | | | | |
|---|---|---|---|---|
| 5,477,131 A * | 12/1995 | Gegner | H02M 3/158 | 323/344 |
| 5,946,208 A * | 8/1999 | Yamamoto | H02M 7/538 | 363/41 |
| 8,339,056 B1 * | 12/2012 | Xiong | H05B 41/2828 | 315/307 |
| 10,193,462 B1 * | 1/2019 | Leong | H02M 7/4807 | |
| 11,368,089 B2 * | 6/2022 | Chakraborty | H02M 3/1584 | |

(Continued)

*Primary Examiner* — Yusef A Ahmed

(57) ABSTRACT

A zero current and voltage transition technique (ZCVTT) switching circuit includes a switch, and a passive block coupled to the switch and configured to damp an input signal from the switch. The switching circuit further includes a recycle positive energy (RPE) block coupled to the passive block and configured to recycle positive energy from a positive spike from the passive block, and a recycle negative energy (RNE) block coupled to the passive block and configured to recycle negative energy from a negative spike from the passive block.

18 Claims, 20 Drawing Sheets

(56) References Cited

U.S. PATENT DOCUMENTS

2002/0140403 A1* 10/2002 Reddy ..................... H02J 9/062 320/162
2005/0226012 A1* 10/2005 Jovanovic ............. H02M 3/156 363/59
2005/0243579 A1* 11/2005 Jang .................. H02M 3/33546 363/16
2008/0130326 A1* 6/2008 Kuan .................. H02M 3/1588 363/21.14
2011/0025410 A1* 2/2011 Hill ........................ H03J 1/0008 327/553
2011/0062935 A1* 3/2011 Gray ....................... H02M 1/38 307/31
2012/0099348 A1* 4/2012 Umetani ............... H02M 3/158 363/37
2012/0113688 A1* 5/2012 Liang .................... H02M 3/285 363/21.12
2012/0314456 A1* 12/2012 Lanni .................. H02M 1/4258 363/21.02
2014/0226375 A1* 8/2014 Feno ................... H02M 1/4233 363/44
2014/0319919 A1* 10/2014 Fu ......................... H02M 7/487 307/43
2015/0244284 A1* 8/2015 Fu ......................... H02M 7/537 363/41
2015/0263644 A1* 9/2015 Fu ......................... H02M 7/487 363/95
2016/0043630 A1* 2/2016 Hung .................. H02M 1/4225 363/126
2016/0043631 A1* 2/2016 Hung .................. H02M 1/4225 363/126
2016/0285371 A1* 9/2016 Fu ....................... H02M 7/4837
2016/0365794 A1* 12/2016 Lawson .................... H02J 3/32
2016/0380425 A1* 12/2016 Chapman .......... H02M 3/33573 363/21.01
2017/0085183 A1* 3/2017 Notsch .................... H02M 1/44
2017/0163163 A1* 6/2017 Jang .................... H02M 3/1582
2018/0069490 A1* 3/2018 Fu ......................... H02M 7/487
2020/0136500 A1* 4/2020 Joo ........................ H05B 44/00
2021/0273578 A1* 9/2021 Sigamani ............ H02M 1/0074
2022/0399816 A1* 12/2022 Phadke ................. H02M 1/346
2023/0010711 A1* 1/2023 Mayell .................... H02M 1/36
2025/0293584 A1* 9/2025 Jitaru .................. H02M 1/4258

* cited by examiner

| Parameter | Buck | Boost | ZCVTT |
|---|---|---|---|
| Wide Battery Voltage, Fixed Bus Voltage | Yes | No, needs additional DC/DC stage | Yes (with High efficiency) ⇧ |
| Efficiency | Medium | High | Higher ⇧ |
| Switching Frequency | Medium | Medium | High ⇧ |
| Switching di/dt | Medium | High | Low ⇩ |
| EMI | High | Higher | Low ⇩ |
| Cost | Low | Low | Lower ⇩ |

Improvements of ZCVTT over Standard Topologies in DC-DC Converters

FIG. 4

| Parameter | 2-Level | 3-Level NPC | 3-Level ANPC | 3-Level TNPC | ZCVTT | |
|---|---|---|---|---|---|---|
| THD of output current | High | Very Low | Very low | | Lower | ⇩ |
| Peak voltage stress on active and passive devices | High | Low | Low | Low /(High Blocking) | High | |
| Power Density | Low | High | Higher | High | Higher | ⇧ |
| Bidirectional | Yes | Yes | Yes | Yes | Yes | |
| Conduction loss | Low | high | Mid | Mid | Low | |
| Switching loss | High | Low | Low | Mid | Lower | ⇩ |
| Switching Frequency | | | | | Double or Triple | ⇩ |
| Efficiency | Low | Mid | Highest (at high frequency) | High | Highest (at higher frequency) | ⇧ |
| Cost | Low | Mid | High | Mid | Low | ⇧ |
| Control | Easy | Mid | Complex | Mid | Easy | |
| Input inductor size | Large | Small | Small | Small | Smaller | ⇩ |
| Switching di/dt | High | | | | Very Low | ⇩ |
| EMI | High | | | | Low | ⇩ |

Improvements of ZCVTT over Standard Topologies in Bidirectional AC-DC Converters

FIG. 5

Unidirectional DC-DC Boost Converter with ZCVTT
For using the ZCTT block in this topology, remove
ZVS1 and ZVS2, and bypass LS2 in circuit 201

Conventional Unidirectional DC-DC Boost Converter

Unidirectional Synchronous DC-DC Boost Converter with ZCVTT
For using the ZCTT block in this topology, remove ZVS1 and
ZVS2 and bypass LS2 in circuit 201

Bidirectional Synchronous DC-DC Boost Converter with ZCVTT
For using the ZCTT block in this topology, remove ZVS1 and
ZVS2 in circuit 201

Unidirectional DC-DC Buck Converter with ZCVTT
For using the ZCTT block in this topology, remove ZVS1 and ZVS2 and bypass LS1 in circuit 201

Conventional Unidirectional DC-DC Buck Converter

Bidirectional Synchronous DC-DC Buck Converter with ZCVTT
For using the ZCTT block in this topology, remove ZVS1 and
ZVS2 in circuit 201

Unidirectional Synchronous DC-DC Buck Converter with ZCVTT
For using the ZCTT block in this topology, remove ZVS1 and
ZVS2 and bypass LS1 in circuit 201

Conventional Single Phase Unidirectional AC-DC Converter

Single Phase Unidirectional AC-DC Converter with ZCVTT
For using the ZCTT block in this topology, remove ZVS1 and ZVS2 and bypass LS2 in circuit 201

Single Phase Unidirectional Synchronous DC-AC Inverter with ZCVTT
For using the ZCTT block in this topology, remove ZVS1 and ZVS2 and bypass LS1, in circuit 201

Single Phase Bidirectional Synchronous AC-DC/DC-AC Converter/Inverter with ZCVTT
For using the ZCTT block in this topology, remove ZVS1 and ZVS2 in circuit 201

Three Phase AC-DC with ZCVTT
For using the ZCTT block in this topology, remove ZVS1 and ZVS2 in circuit 201

Three Phase DC-AC with ZCVTT
For using the ZCTT block in this topology, remove ZVS1 and ZVS2 in circuit 201

Three Phase Bidirectional with ZCVTT
For using the ZCTT block in this topology, remove ZVS1 and ZVS2 in circuit 201

NON-ISOLATED ZERO CURRENT AND VOLTAGE TRANSITION TECHNIQUE (ZCVTT)

CROSS-REFERENCE TO RELATED APPLICATIONS

This application is a continuation of U.S. patent application Ser. No. 17/785,039, titled Novel Non-Isolated Zero Current and Voltage Transition Technique (ZCVTT) and filed on Jun. 13, 2022, which is a National Stage Entry of PCT Application No. PCT/US2022/032451, titled Novel Non-Isolated Zero Current and Voltage Transition Technique (ZCVTT) and filed on Jun. 7, 2022, which claims the benefit and priority of U.S. Provisional Application No. 63/197,890, titled Novel Non-Isolated Zero Current and Voltage Transition Technique (ZCVTT) and filed on Jun. 7, 2021, the entire contents of all being hereby incorporated by reference in their entirety.

BACKGROUND

1. Field

The present disclosure relates to circuits used in power switching topologies and, more particularly, to circuits that reduce power loss and increase efficiency in power switching topologies.

2. Description of the Related Art

Power and other switches of various configurations are used in many electronic devices today. For example, power switches may be incorporated in fuel cell DC-DC converters, inverters connected to solar panels, wind turbine power inverters, chargers and traction systems for electric vehicles, major home appliances, or the like. All these power switches have some inherent inefficiency, i.e., power loss. Power switching loss occurs, for example, when a switch is transitioning from a blocking state (i.e., in which the switch prevents throughput of current) to a conducting state (i.e., in which current is allowed to flow through the switch) and when transitioning from the conducting state to the blocking state. Power switches also experience conduction loss which occurs when the switch is in full conduction and is based on the current used to power the switch.

With the present push towards reducing fossil fuels, more electrical devices are designed to operate using electricity. For the most part, these devices utilize switches (e.g., in the power supplies). By reducing the loss caused by the power switches, the operation of the electrical devices may be improved. For example, a battery charger with a more efficient power switch charges a battery using lower energy from the grid than a battery charger using a lossy power switch. As another example, an electric vehicle utilizing a more efficient power switch may travel for a longer distance than the same vehicle with a lossy power switch. Furthermore, higher switch efficiency reduces electrical waste, thus reducing the amount of power drawn from power plants, which may reduce the amount of fossil fuels being burned by such plants.

Thus, there is a need in the art for power and other switches designed to have reduced loss and improved efficiency.

SUMMARY

Described herein is a switching circuit that includes a switch, and a passive block coupled to the switch and configured to damp an input signal from the switch. The switching circuit further includes a recycle positive energy (RPE) block coupled to the passive block and configured to recycle positive energy from a positive spike from the passive block, and a recycle negative energy (RNE) block coupled to the passive block and configured to recycle negative energy from a negative spike from the passive block.

In any of the foregoing embodiments, the passive block is a zero current and voltage transition technique (ZCVTT) block and includes a zero current switching block, a first zero voltage switching block, and a second zero voltage switching block.

In any of the foregoing embodiments, the passive block is a zero current transition technique (ZCTT) block and includes only a zero current switching block.

In any of the foregoing embodiments, the switch includes a first switch and a second switch, and the passive circuit includes: a first terminal coupled to a voltage line; a second terminal coupled to the first switch; a third terminal coupled to the RPE block; a fourth terminal coupled to an electrical ground; a fifth terminal coupled to the second switch; a sixth terminal coupled to the RNE block; and a seventh terminal coupled to an input voltage.

In any of the foregoing embodiments, the RPE block and the RNE block each include an input terminal coupled to the passive block, a ground terminal coupled to an electrical ground, and an output terminal coupled to a voltage line such that the recycled positive energy and the recycled negative energy is provided to the voltage line.

In any of the foregoing embodiments, the RPE block and the RNE block each include a pulse width modulator (PWM) coupled between the input terminal and the output terminal.

In any of the foregoing embodiments, the RPE block and the RNE block are each active blocks containing both active circuit elements and passive circuit elements.

Any of the foregoing embodiments may further include a second switch and a second passive block coupled to the second switch and configured to damp a second input signal from the second switch, wherein the RPE block is coupled to the first passive block and to the second passive block and configured to recycle positive energy from the first passive block and from the second passive block, and the RNE block is coupled to the first passive block and to the second passive block and configured to recycle negative energy from the first passive block and from the second passive block.

In any of the foregoing embodiments, the passive block, the RPE block, and the RNE block are configured to be used with a direct current (DC) to DC converter, an alternating current (AC) to DC converter, and a DC to AC inverter.

Also disclosed is a circuit for increasing efficiency of a switching system that includes a switch. The circuit includes a passive block coupled to the switch and configured to damp an input signal from the switch. The circuit further includes a recycle positive energy (RPE) block coupled to the passive block and configured to recycle positive energy from a positive spike from the passive block, and a recycle negative energy (RNE) block coupled to the passive block and configured to recycle negative energy from a negative spike from the passive block.

In any of the foregoing embodiments, the passive block is a zero current and voltage transition technique (ZCVTT) block and includes a zero current switching block, a first zero voltage switching block, and a second zero voltage switching block.

In any of the foregoing embodiments, the passive block is a zero current transition technique (ZCTT) block and includes only a zero current switching block.

In any of the foregoing embodiments, the switch includes a first switch and a second switch, and the passive circuit includes: a first terminal coupled to a voltage line; a second terminal coupled to the first switch; a third terminal coupled to the RPE block; a fourth terminal coupled to an electrical ground; a fifth terminal coupled to the second switch; a sixth terminal coupled to the RNE block; and a seventh terminal coupled to an input voltage.

In any of the foregoing embodiments, the RPE block and the RNE block each include an input terminal coupled to the passive block, a ground terminal coupled to an electrical ground, and an output terminal coupled to a voltage line such that the recycled positive energy and the recycled negative energy is provided to the voltage line.

In any of the foregoing embodiments, the RPE block and the RNE block each include a pulse width modulator (PWM) coupled between the input terminal and the output terminal.

In any of the foregoing embodiments, the RPE block and the RNE block are each active blocks containing both active circuit elements and passive circuit elements.

Any of the foregoing embodiments may further include a second switch and a second passive block coupled to the second switch and configured to damp a second input signal from the second switch, wherein the RPE block is coupled to the first passive block and to the second passive block and configured to recycle positive energy from the first passive block and from the second passive block, and the RNE block is coupled to the first passive block and to the second passive block and configured to recycle negative energy from the first passive block and from the second passive block.

In any of the foregoing embodiments, the passive block, the RPE block, and the RNE block are configured to be used with a direct current (DC) to DC converter, an alternating current (AC) to DC converter, and a DC to AC inverter.

Also disclosed is a switching circuit. The switching circuit includes a switch, and a passive block coupled to the switch in a series configuration and configured to damp an input signal from the switch. The switching circuit further includes a recycle positive energy (RPE) block coupled to the passive block and configured to recycle positive energy from a positive spike from the passive block. The switching circuit further includes a recycle negative energy (RNE) block coupled to the passive block and configured to recycle negative energy from a negative spike from the passive block.

In any of the foregoing embodiments, the RPE block and the RNE block each include an input terminal coupled to the passive block, a ground terminal coupled to an electrical ground, and an output terminal coupled to a voltage line such that the recycled positive energy and the recycled negative energy is provided to the voltage line.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 4 is a table illustrating advantages of ZCVTT technology relative to conventional direct current (DC)-DC converters according to some embodiments of the present disclosure;

FIG. 5 is a table illustrating advantages of ZCVTT technology relative to conventional alternating current (AC)-DC converters according to some embodiments of the present disclosure;

DETAILED DESCRIPTION

The present disclosure describes systems, apparatuses, and methods for zero current and voltage transition technique (ZCVTT) switching in circuits. The ZCVTT switching circuits described herein provide significant advantages over conventional switching circuits. For example, the circuits of the present disclosure are designed to recycle extra energy generated during operation of the switching to reduce power loss during operation. This increased efficiency reduces power consumption, thus providing advantages such as allowing a single battery charge to power a device for a longer period of time and reducing the energy to charge a battery.

Standard soft switching technology that includes zero voltage switching has been used in direct current (DC) to DC converters at high loads. At low power ranges, standard ZVS acts similarly to a hard switch. ZCVTT, on the other hand, modifies half-bridge and full-bridge topologies and combines soft switching topologies with additional passive/active circuit elements in order to limit the rate of change of current (di/dt) and voltage (dv/dt) during switching, which in turn reduces switching loss and increases efficiency. ZCVTT is also effective at the switching interval by driving at least one of current (i) or voltage (v) to zero, thus bringing the product of the two (iv) as close to zero as possible.

Figure 1A:
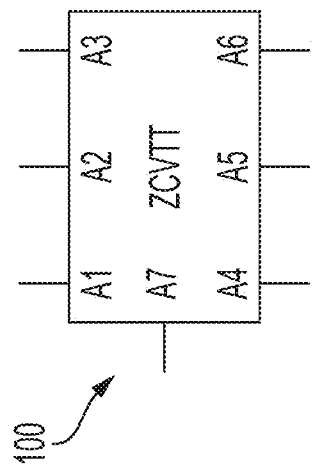
FIGS. 1A-1C illustrate specific blocks of zero current and voltage transition technique (ZCVTT) disclosed herein including a ZCVTT block, a recycle positive energy (RPE) block, and a recycle negative energy (RNE) block according to some embodiments of the present disclosure.
Figure 1B:
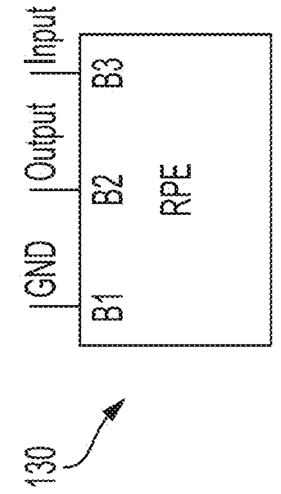
Figure 1C:
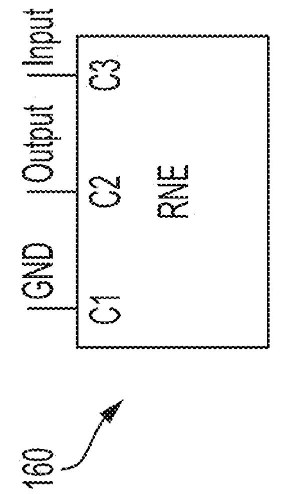
Figure 2:
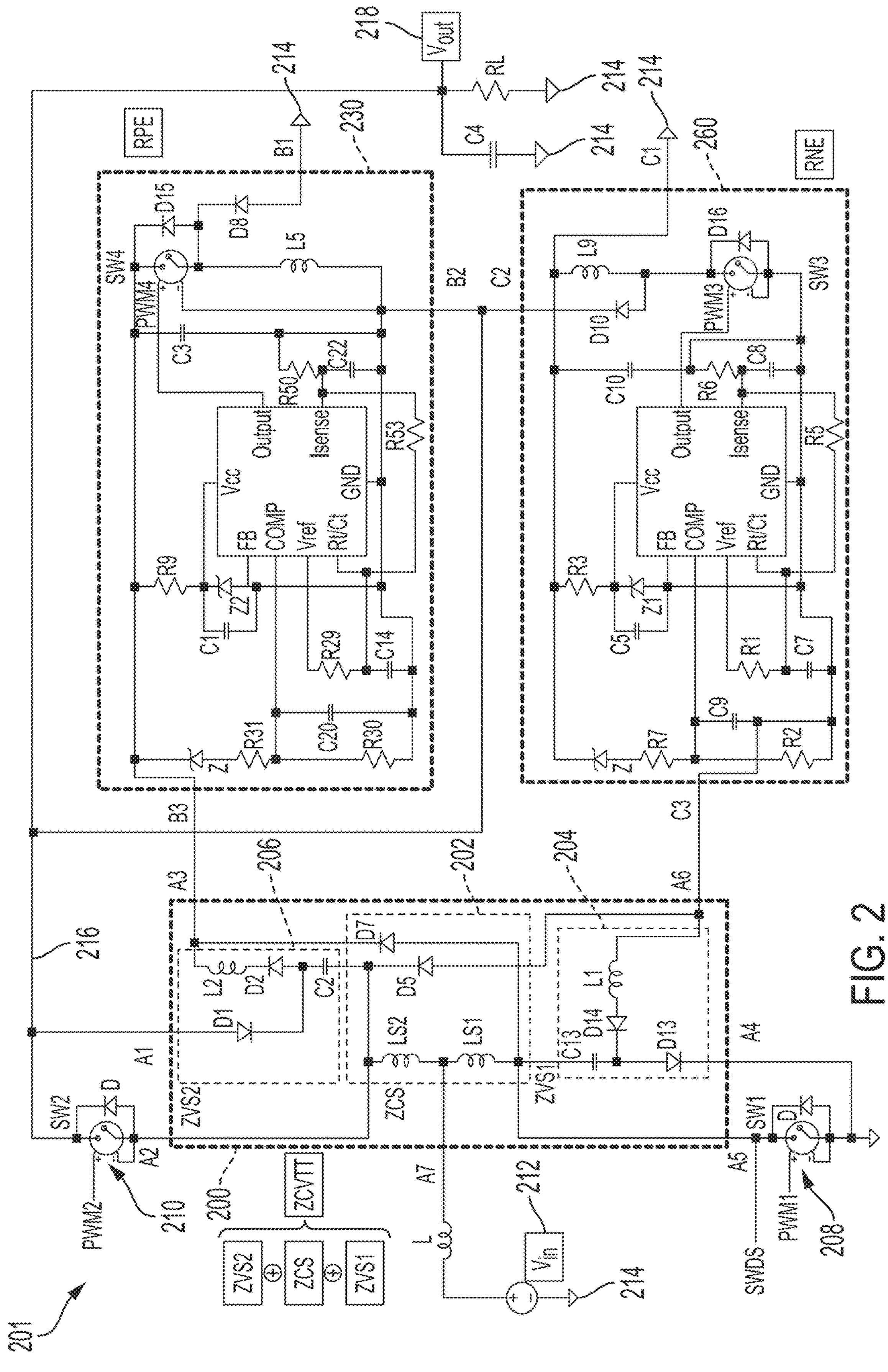
FIG. 2 is a schematic diagram illustrating an exemplary circuit layout of the ZCVTT blocks of FIGS. 1A-1C according to some embodiments of the present disclosure.
Figure 3:
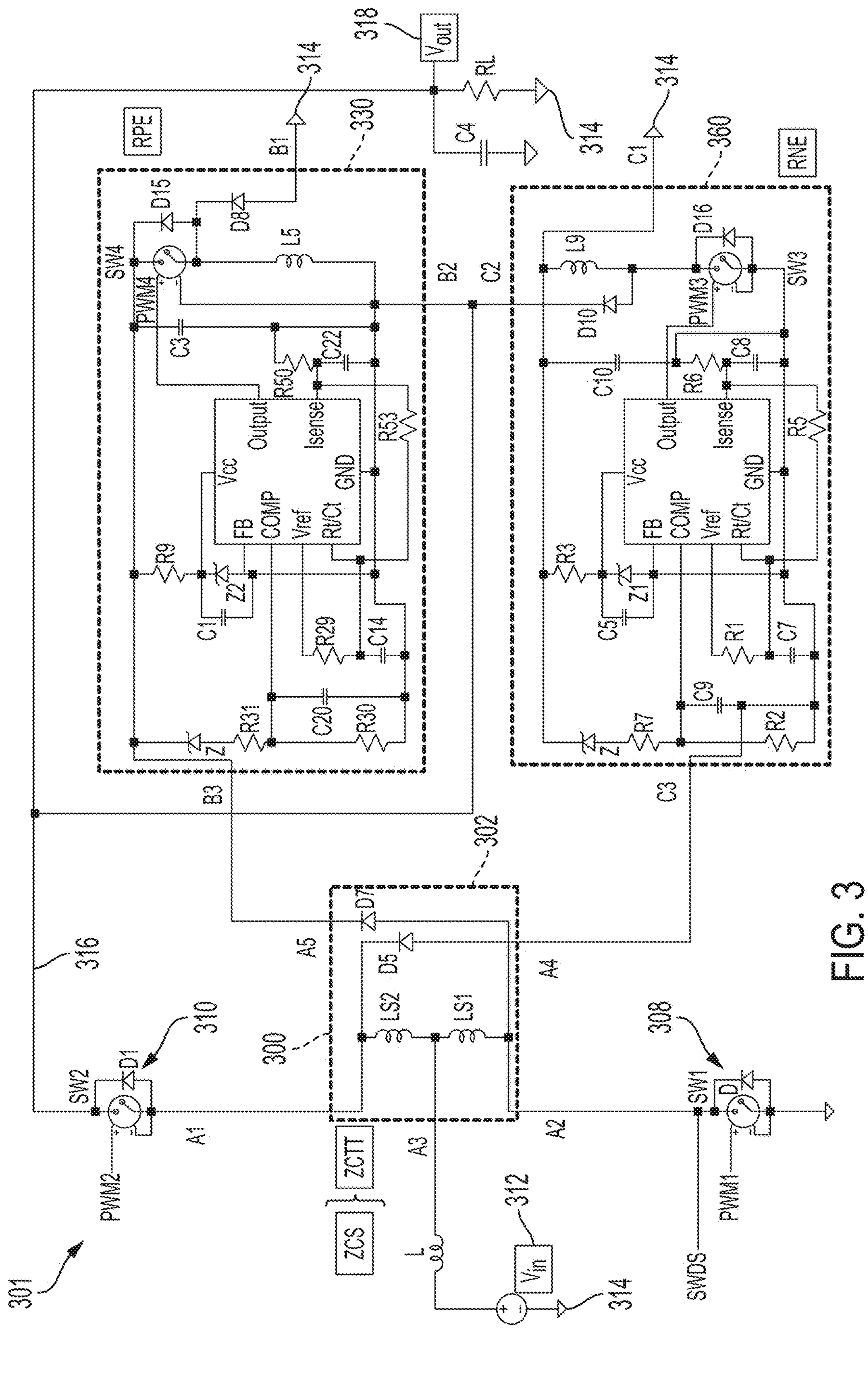
FIG. 3 is a schematic diagram illustrating an exemplary circuit layout of zero current transition technique (ZCTT) blocks according to some embodiments of the present disclosure.

Referring to FIGS. 1-3, the ZCVTT innovation consists of three blocks: (1) a ZCVTT block 100 (which, as described below, includes three sub-blocks: ZCS, ZVS1, and ZVS2); a recycle positive energy (RPE) block 130, and a recycle negative energy (RNE) block 160. The ZCVTT block 100 includes 7 terminals (i.e., input terminals and/or output terminals), labeled A1-A7; the RPE block 130 includes three terminals labeled B1-B3, and the RNE block 160 includes three terminals labeled C1-C3. The ZCVTT innovation includes using the ZCVTT block 100 simultaneously with the RPE block 130 and the RNE block 160 to recycle truncated energy back to the switching circuit. That is, the RPE block 130 provides recycled positive energy back to the switching circuit while the RPE block 160 provides recycled negative energy back to the switching circuit. The recycled positive and negative energy can be used by the circuit such that the energy that would otherwise be lost can instead be applied as useful energy. This significantly reduces loss and increases efficiency of the switching circuit to which ZCVTT is applied. The ZCVTT innovation can be applied to all non-isolated unidirectional and bidirectional DC-DC (boost and buck), and half-bridge and full-bridge DC-alternating current (AC) and AC-DC topologies.

The ZCVTT blocks 100, 130, 160 may be used in a circuit in series with any switch such as an insulated-gate bipolar transistor (IGBT), a silicon (Si) or silicon carbide (SiC) metal-oxide-semiconductor field-effect transistor (MOSFET), and a gallium nitride (GaN) transistor. A designer of the switch may select any of these switches for use with the ZCVTT technology. Depending on the topology and application, multiple instances of ZCVTT blocks 100 may be added to a standard circuit. For example, in a 3-phase bidirectional DC-AC inverter, three ZCVTT blocks 100 may be added. In most topologies and applications, only a single RPE block 130 and a single RNE block 160 may be added to the circuit. In some instances, a zero current transition technique (ZCTT) block may be used in place of the ZCVTT block 100; in such instances, the circuit may only include a single ZCS block and no ZVS block. A switch designer may include a ZCTT block rather than a ZCVTT block for any reason such as size constraints, cost constraints, desirable operation of the switch, or the like. A ZCVTT block may be more expensive and sizeable, yet may provide greater efficiency than ZCTT.

Referring to FIG. 2, a circuit 201 showing an exemplary set of ZCVTT blocks is illustrated. As shown, the circuit 201 may include a ZCVTT block 200, a RPE block 230, and a RNE block 260. The ZCVTT block 200 includes a ZCS block 202 coupled between a ZVS1 block 204 and a ZVS2 block 206. A first switch 208 may be coupled to the ZCS block 202 (via the terminal A5) and the ZVS1 block 204 (via the terminal A4), and a second switch 210 may be coupled to the ZCS block 202 (via the terminal A2) and the ZVS2 block 206 (via the terminal A1). A voltage source 212 may be coupled to the ZCS block 202 via the terminal A7.

The RPE block 230 may be coupled to an output of the ZVS2 block 206 via the terminal A3 of the ZCVTT block 200 and the terminal B3 of the RPE block 230. The RNE block 260 may be coupled to an output of the ZVS1 block 204 via the terminal A6 of the ZCVTT block 200 and the terminal C3 of the RNE block 260. The RPE block 230 may be coupled to an electrical ground 214 via the terminal B1, and the RNE block 260 may be coupled to the ground 214 via the terminal C1. The RPE block 230 may be coupled to a voltage line 216 and may provide at least one of output voltage or output current to the voltage line 216 via the terminal B2. Similarly, the RNE block 260 may be coupled to the voltage line 216 and may provide at least one of output voltage or output current to the voltage line 216 via the terminal C2. The RPE block 230 provides recycled positive energy to the voltage line 216, and the RNE block 260 provides recycled negative energy to the voltage line 216. The voltage line 216 may be coupled to an output terminal 218 such that the voltage (or current, i.e., the recycled energy) on the voltage line 216 is provided as the output of the circuit 201 to allow the recycled energy to be provided elsewhere in the system in which the circuit 201 is implemented.

Operation of the RPE and RNE blocks will now be explained. Logic functions in the RPE block may be provided by a controller PWM4. The controller PWM4 may include any controller, processor, or other logic device (e.g., a collection of switches or other electronic components) that provide a logic function. For example, the controller PWM4 may include a pulse width modulator (PWM) controller. The controller PWM4 may further include a non-transitory memory capable of storing instructions usable by the logic device, and may be capable of storing information as requested by the logic device. PWM4 may be designed to take specific actions based on a sensed voltage. For example, PWM4 may control the switch SW4 based on a sensed voltage. In particular, the Isense terminal of PWM4 may detect a voltage corresponding to a voltage across capacitor C3, which corresponds to a voltage output by terminal A3 of the ZCVTT block 200. In response to the voltage reaching or exceeding a threshold voltage, PWM4 may control SW4 between an on state and an off state. PWM4 may control SW4 to turn on (i.e., close the circuit) in order to charge inductor L5, and may control SW4 to turn off (i.e., open the circuit) in order to release the energy from the inductor L5 back to the system. The energy may pass through diode D8 to return to the system.

Logic functions in the RNE block may be provided by a controller PWM3. The controller PWM3 may include any controller, processor, or other logic device (e.g., a collection of switches or other electronic components) that provide a logic function. For example, the controller PWM3 may include a pulse width modulator (PWM) controller. The controller PWM3 may further include a non-transitory memory capable of storing instructions usable by the logic device, and may be capable of storing information as requested by the logic device. PWM3 may be designed to take specific actions based on a sensed voltage. For example, PWM3 may control the switch SW3 based on a sensed voltage. In particular, the Isense terminal of PWM3 may detect a voltage corresponding to a voltage across capacitor C10, which corresponds to a voltage output by terminal A6 of the ZCVTT block 200. In response to the voltage reaching or exceeding a threshold voltage, PWM3 may control SW3 between an on state and an off state. PWM3 may control SW3 to turn on (i.e., close the circuit) in order to charge inductor L9, and may control SW3 to turn off (i.e., open the circuit) in order to release the energy from the inductor L9 back to the system. The energy may pass through diode D10 to return to the system.

Turning now to FIG. 3, a circuit 301 showing an exemplary set of ZCTT blocks is shown. As mentioned previously, ZCTT is a special case of ZCVTT with only one ZCS block and no ZVS blocks. In particular, the circuit 301 may include a ZCTT block 300 (which comprises a single ZCS block 302), a RPE block 330, and a RNE block 360. The ZCS block 302 includes similar features and a similar configuration as the ZCS block 202 of FIG. 2. The ZCTT block 300 includes 5 terminals (labeled A1-A5) rather than the 7 terminals of a ZCVTT block. In particular, the terminal A4 is coupled to a terminal C3 of the RNE block 360, and the terminal A5 is coupled to a terminal B3 of the RPE block 330. The terminal A2 is coupled to a first switch 308, and the terminal A1 is coupled to a second switch 310. The terminal A3 is coupled to a power supply 312.

The RPE block 330 may include similar features and a similar configuration as the RPE block 230 of FIG. 2, and the RNE block 360 may include similar features and a similar configuration as the RNE block 260 of FIG. 2. The operation of the RPE block 330 and the RNE block 360 may function in a similar manner as the RPE block 230 and the RNE block 260 of FIG. 2. In that regard, a terminal B1 of the RPE block 330 may be coupled to an electrical ground 314, and a terminal C1 of the RNE block 360 may be coupled to the ground 314. A terminal B2 of the RPE block 330 may be coupled to a voltage line 316 and provide recycled energy to the voltage line 316, and a terminal C2 of the RNE block 360 may be coupled to the voltage line 316 and provide recycled energy to the voltage line 316. The voltage line 316 may be coupled to an output terminal 318 to allow the recycled energy to be provided elsewhere in the system in which the circuit 301 is implemented.

Various active and passive electrical components (e.g., resistors, capacitors, inductors, integrated circuits (ICs), switches, or the like) may be included in the circuit 201 of FIG. 2 or the circuit 301 of FIG. 3 to provide various functionality. Although specific ICs are shown, one skilled in the art will realize that any IC capable of performing one or more logic function may be included without departing from the scope of the present disclosure. Similarly, any type of switch may be included without departing from the scope of the present disclosure. Furthermore, the values of the passive elements (e.g., resistors, capacitors, inductors) may vary based on the desired functionality and performance of the specific circuit without departing from the scope of the present disclosure. Similarly, the topology or configuration of various blocks within the circuits 201, 301 may be adjusted or altered based on desired operation or configuration without departing from the scope of the present disclosure.

The ZCVTT innovation described and shown herein (along with the ZCTT innovation) may provide various advantages relative to other switching circuits that do not incorporate features of ZCVTT or ZCTT. For example, the ZCVTT and ZCTT innovations provide greater efficiency, greater power density, and greater switching frequency for any switching circuit topology described herein. Furthermore, the ZCVTT and ZCTT innovations result in a reduced rate of change of current (di/dt) and voltage (dv/dt), electromagnetic interference (EMI), weight, and overall size for any switching circuit topology described herein. When size limitations are present for conventional switching circuits, it may be impossible to use a standard boost circuit topology due to power loss, junction to case thermal resistance ($\theta_{jc}$), and limitation of the maximum junction temperature (e.g., 150 degrees Celsius or 175 degrees Celsius). Addition of ZCVTT to the circuit results in the boost topology being feasible due to the benefits offered by ZCVTT and ZCTT. ZCVTT (and ZCTT) furthermore utilize gate resistance (RG) values that are closer to the switching characteristics found in switch datasheets (e.g., for IGBT, SiC, etc.). Furthermore, as the switching frequency of switching circuits is increased and the size is decreased by adding ZCVTT or ZCTT elements, use of smaller inductor/capacitor filters are feasible to generate pure sine waves in applications such as DC-AC inverters used in motor controllers, thus increasing the overall efficiency of the motor.

Turning now to FIG. 4, a table illustrates improvements offered by inclusion of ZCVTT (and ZCTT) technology in a switching circuit relative to multiple conventional topologies in a DC-DC converter. The advantages mirror those described above and have been validated in testing. As shown, the ZCVTT and ZCTT technology improves many parameters of DC-DC switching circuits, providing greater efficiency, reduced loss, reduced cost, and improved performance relative to each of the conventional DC-DC topologies. Turning to FIG. 5, a table illustrates improvements offered by inclusion of ZCVTT (and ZCTT) technology in a switching circuit relative to multiple conventional topologies in an AC-DC converter (e.g., for bidirectional AC-DC converters). As shown, the ZCVTT and ZCTT technology improves many parameters of AC-DC switching circuits, providing greater efficiency, reduced loss, reduced cost, and improved performance relative to each of the conventional AC-DC topologies.

FIGS. 6A-6H illustrate exemplary circuit diagrams showing exemplary implementation of ZCVTT technology in various DC-DC converters (both boost and buck). The terminal identifiers (A1-A7, B1-B3, and C1-C3) indicate the same terminals shown in FIG. 2, and additional information is provided regarding the circuit diagram 201 of FIG. 2 to facilitate inclusion of the ZCVTT technology, where applicable. The ZCVTT blocks may be placed in the circuits of FIGS. 6A-7H as shown (i.e., the ZCVTT, RNE, and RPE blocks may be inserted into these drawings exactly as they are shown in FIG. 2). A description of how to revise the ZCVTT blocks of FIG. 2 to implement ZCTT (rather than ZCVTT) in each of the examples is also provided. That is, the ZCVTT block of FIG. 2 may be revised as discussed with regards to each drawing and placed in the ZCVTT block of the specific drawing in order to implement ZCTT instead of ZCVTT.

Figure 6B:
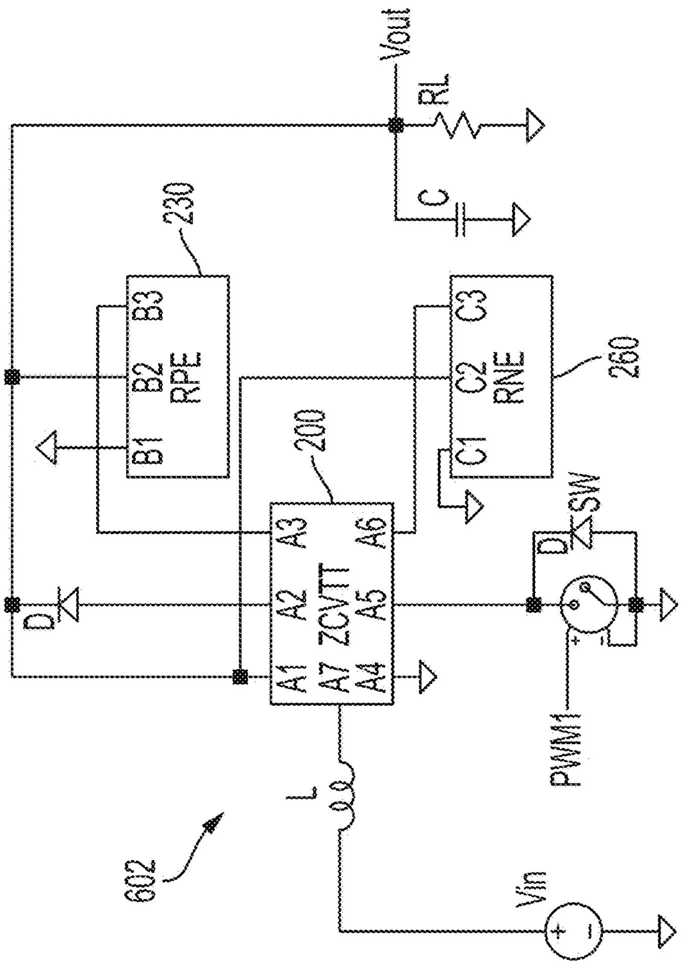
FIG. 6B is a schematic diagram illustrating a circuit layout of a DC-DC boost converter with ZCVTT technology included according to some embodiments of the present disclosure.
Figure 6A:
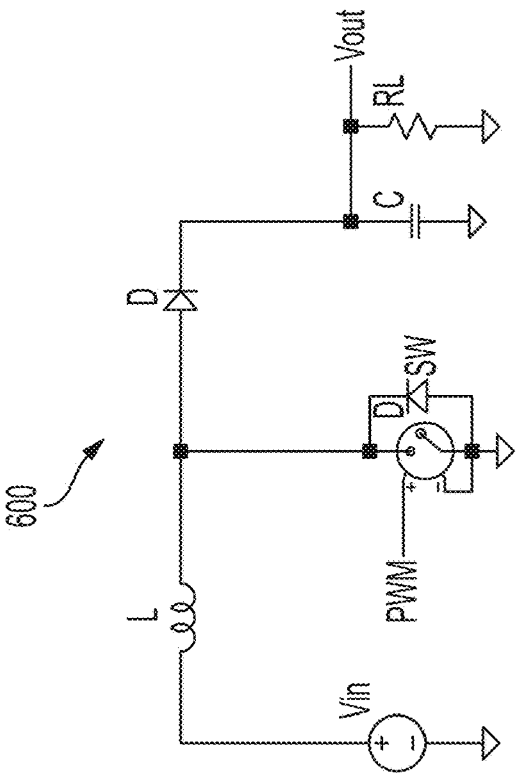
FIG. 6A is a schematic diagram illustrating a circuit layout of a conventional DC-DC boost converter according to some embodiments of the present disclosure.

FIG. 6A illustrates a circuit 600 showing a conventional unidirectional DC-DC boost converter without ZCVTT or ZCTT technology. As shown, the converter includes a switch SW, an input voltage Vin, and an output voltage Vout, along with various passive circuit elements. FIG. 6B illustrates a circuit 602 that includes the ZCVTT technology. In particular, the circuit 602 includes the ZCVTT block 200, the RPE block 230, and the RNE block 260. As shown, the single switch SW is coupled to the terminal A5 of the ZCVTT block 200, which in turn is coupled to the input voltage Vin, the RPE block 230, the RNE block 260, and the output line Vout. The RPE block 230 and RNE block 260 are also coupled to the output Vout. The ZCVTT block may be unchanged from the version illustrated in FIG. 2. In order to implement ZCTT in the DC-DC boost converter, the circuit 201 of FIG. 2 may be altered by removing the circuit elements in the ZVS1 block and the ZVS2 block, and bypassing LS2. The circuit 602 provides the advantages described above over the circuit 600 such as reduced power loss, increased performance, and increased efficiency.

Figure 6C:
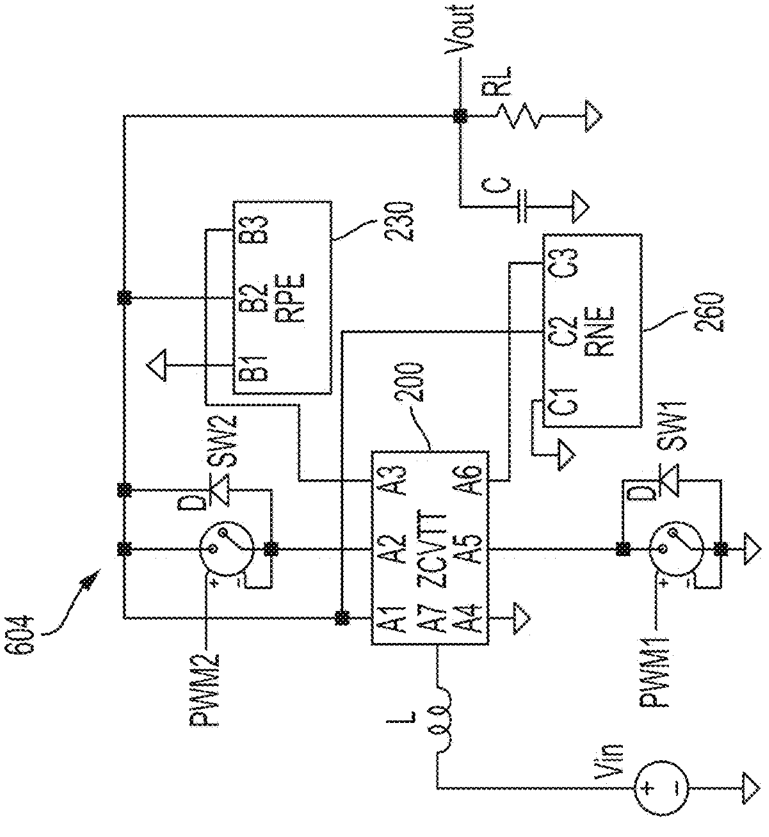
FIG. 6C is a schematic diagram illustrating a circuit layout of a synchronous DC-DC boost converter with ZCVTT technology included according to some embodiments of the present disclosure.

Referring to FIG. 2 and FIG. 6C, a circuit 604 shows a unidirectional synchronous DC-DC boost converter with ZCVTT technology included. As shown, the ZCVTT block 200 is coupled to an input voltage Vin, a RPE block 230, and a RNE block 260. The ZCVTT block is also coupled to a first switch SW1 and a second switch SW2, along with an output Vout. The RPE block 230 and RNE block 260 are also coupled to the output Vout. In order to implement ZCTT in the circuit 604, the circuit 201 of FIG. 2 may be altered by removing the circuit elements in the ZVS1 block and the ZVS2 block, and bypassing LS2.

Figure 6D:
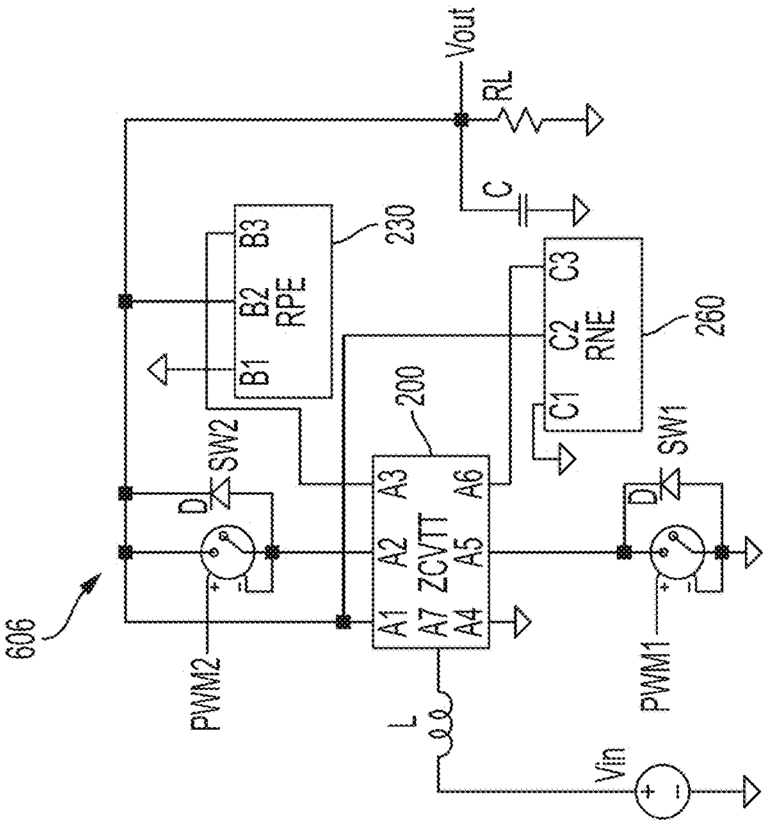
FIG. 6D is a schematic diagram illustrating a circuit layout of a bidirectional synchronous DC-DC boost converter with ZCVTT technology included according to some embodiments of the present disclosure.

Turning to FIGS. 2 and 6D, a circuit 606 shows a bidirectional synchronous DC-DC boost converter with ZCVTT technology included. The circuit 606 may function as desired without adjusting any circuit elements of the circuit 201 of FIG. 2. In order to implement the ZCTT technology in the circuit 606, the circuit 201 of FIG. 2 may be altered by removing the circuit elements in the ZVS1 block and the ZVS2 block.

Figure 6F:
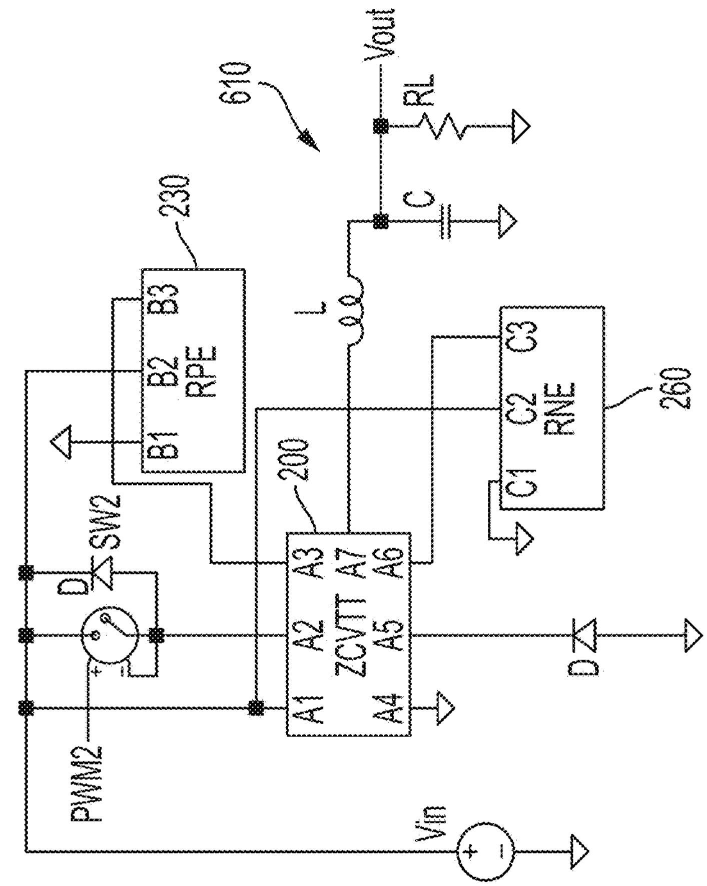
FIG. 6F is a schematic diagram illustrating a circuit layout of a unidirectional DC-DC buck converter with ZCVTT technology included according to some embodiments of the present disclosure.
Figure 6E:
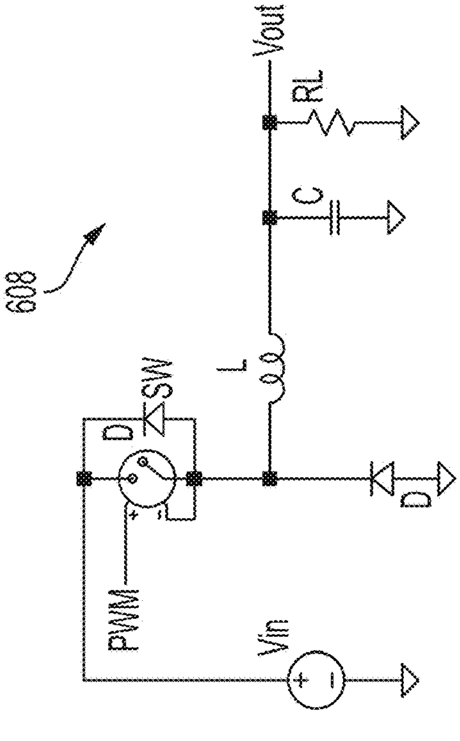
FIG. 6E is a schematic diagram illustrating a circuit layout of a conventional DC-DC buck converter according to some embodiments of the present disclosure.

FIG. 6E illustrates a circuit 608 showing a conventional unidirectional DC-DC buck converter. As shown, the circuit 208 lacks any of the ZCVTT or ZCTT blocks. Referring to FIGS. 2, 6E, and 6F, a circuit 610 illustrates a unidirectional DC-DC buck converter with ZCVTT technology included. As shown, the ZCVTT block 200 is coupled to an input voltage Vin, a RPE block 230, and a RNE block 260. The ZCVTT block is also coupled to a switch SW, along with an output Vout. The RPE block 230 and RNE block 260 are also coupled to the output Vout. In order to implement the ZCTT technology in the circuit 610, the circuit 201 of FIG. 2 may be altered by removing the circuit elements in the ZVS1 block and the ZVS2 block, and bypassing LS1.

Figure 6H:
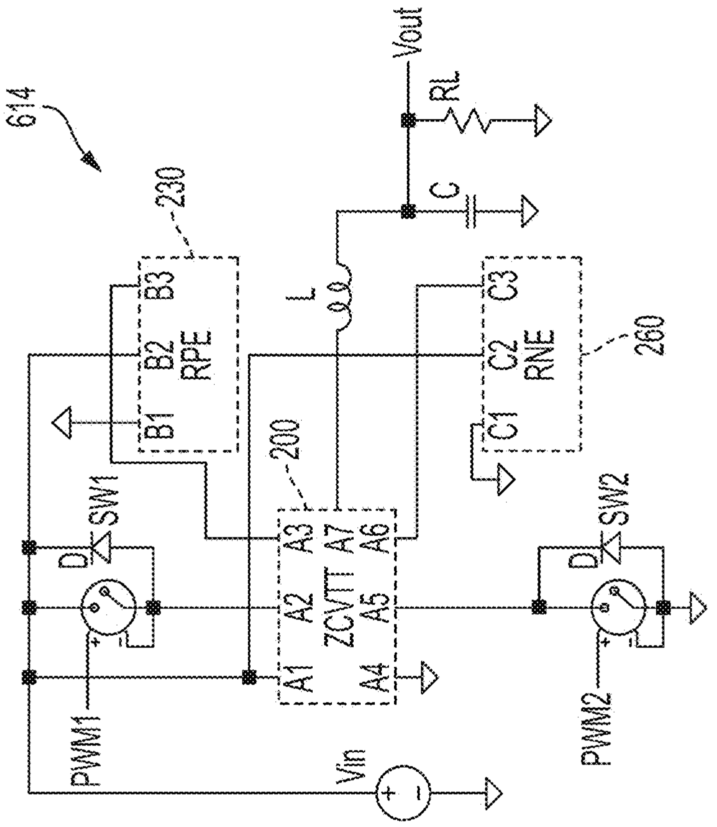
FIG. 6H is a schematic diagram illustrating a circuit layout of a bidirectional synchronous DC-DC buck converter with ZCVTT technology included according to some embodiments of the present disclosure.
Figure 6G:
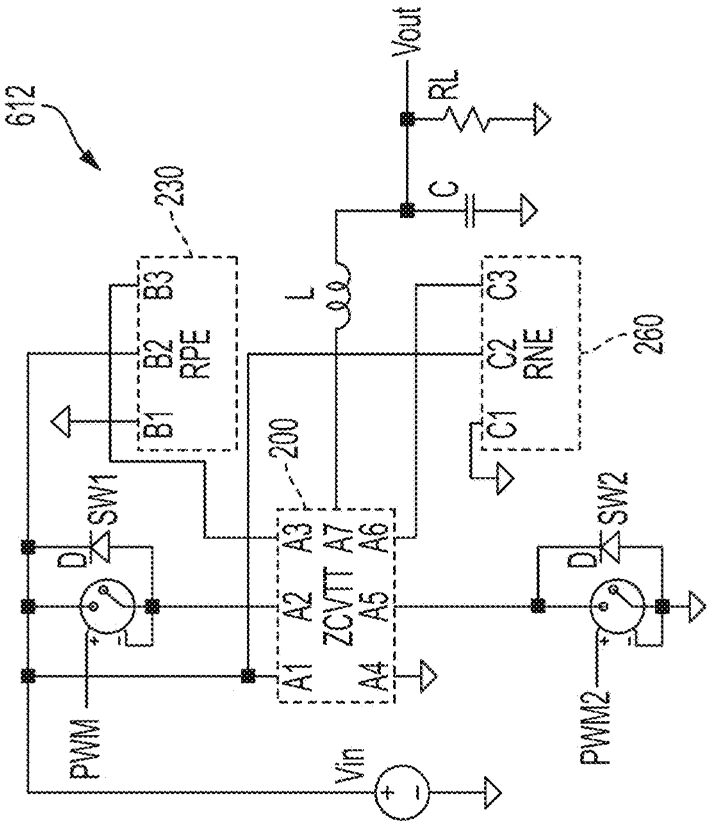
FIG. 6G is a schematic diagram illustrating a circuit layout of a unidirectional synchronous DC-DC buck converter with ZCVTT technology included according to some embodiments of the present disclosure.

Turning to FIGS. 2 and 6G, a circuit 612 illustrates a unidirectional synchronous DC-DC buck converter with ZCVTT technology included. As shown, the ZCVTT block 200 is coupled to an input voltage Vin, a RPE block 230, and a RNE block 260. The ZCVTT block is also coupled to a first switch SW1 and a second switch SW2, along with an output Vout. The RPE block 230 and RNE block 260 are also coupled to the output Vout. In order to implement the ZCTT technology in the circuit 612, the circuit 201 of FIG. 2 may be altered by removing the circuit elements in the ZVS1 block and the ZVS2 block, and bypassing LS1.

Referring to FIGS. 2 and 6H, a circuit 614 illustrates a bidirectional synchronous DC-DC buck converter with ZCVTT technology included. As shown, the ZCVTT block 200 is coupled to an input voltage Vin, a RPE block 230, and a RNE block 260. The ZCVTT block is also coupled to a first switch SW1 and a second switch SW2, along with an output Vout. The RPE block 230 and RNE block 260 are also coupled to the output Vout. The circuit 614 may function as desired without adjusting any circuit elements of the circuit 201 of FIG. 2. In order to implement the ZCTT technology in the bidirectional synchronous DC-DC buck converter, the circuit 201 of FIG. 2 may be altered by removing the circuit elements in the ZVS1 block and the ZVS2 block.

Figure 7A:
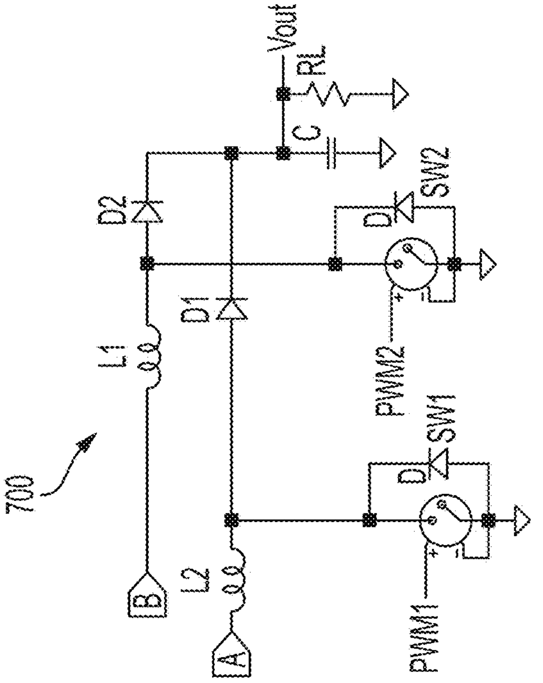
FIG. 7A is a schematic diagram illustrating a circuit layout of a conventional single-phase unidirectional AC-DC converter according to some embodiments of the present disclosure.
Figure 7B:
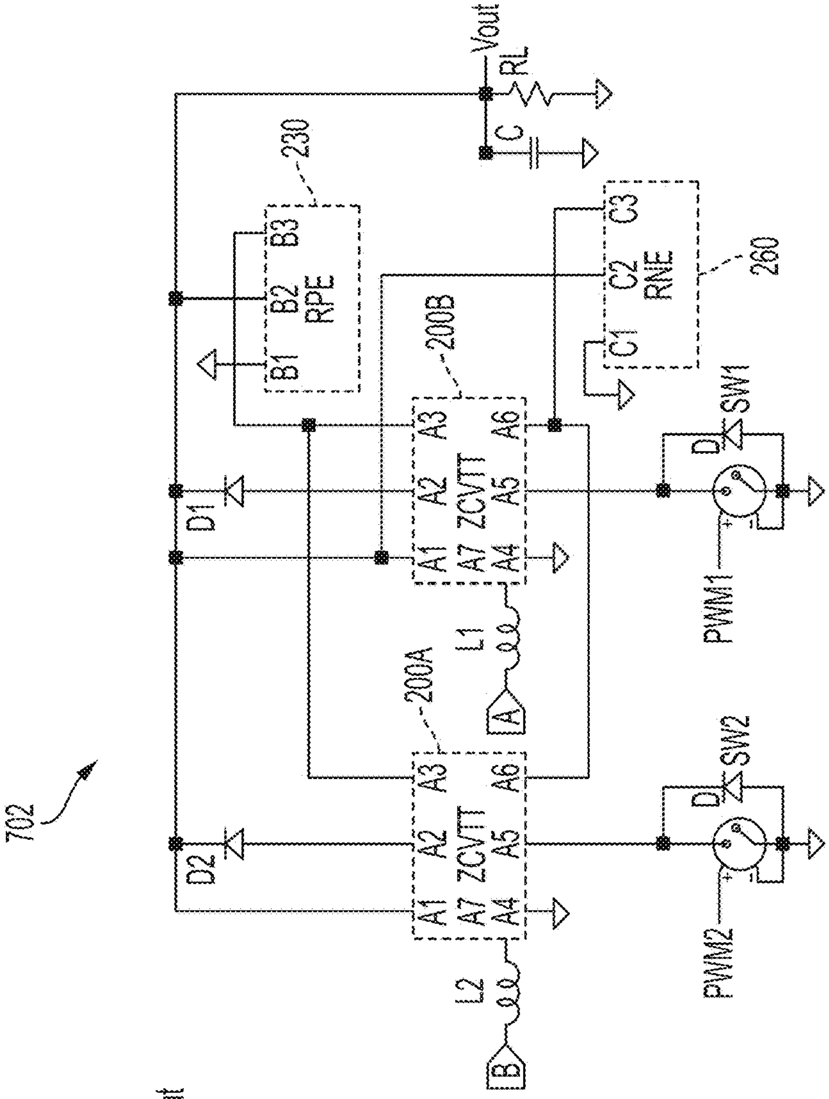
FIG. 7B is a schematic diagram illustrating a circuit layout of a single-phase unidirectional AC-DC converter with ZCVTT technology included according to some embodiments of the present disclosure.

FIG. 7A illustrates a circuit 700 showing a conventional unidirectional AC-DC inverter without ZCVTT or ZCTT technology. As shown, the converter includes two switches SW1 and SW2, an inputs A and B, and an output voltage Vout, along with various passive circuit elements. FIG. 7B illustrates a circuit 702 showing an unidirectional AC-DC inverter that includes ZCVTT technology. In particular, the circuit 702 includes a first ZCVTT block 200A and a second ZCVTT block 200B, the RPE block 230, and the RNE block 260. As shown, the first switch SW1 is coupled to the terminal A5 of the first ZCVTT block 200A and the second switch SW2 is coupled to the terminal A5 of the first ZCVTT block 200A. The ZCVTT blocks 200A, 200B are each coupled to the RPE block 230, the RNE block 260, and the output line Vout. The first ZCVTT block 200A is coupled to the input B and the second ZCVTT block 200B is coupled to the input A. The RPE block 230 and RNE block 260 are also coupled to the output Vout. In order to implement the ZCTT technology in the unidirectional AC-DC converter, the circuit 201 of FIG. 2 may be altered by removing the circuit elements in the ZVS1 block and the ZVS2 block, and bypassing LS2 . . . . The circuit 702 provides the advantages described above over the circuit 700 such as reduced power loss, increased performance, and increased efficiency.

Figure 7C:
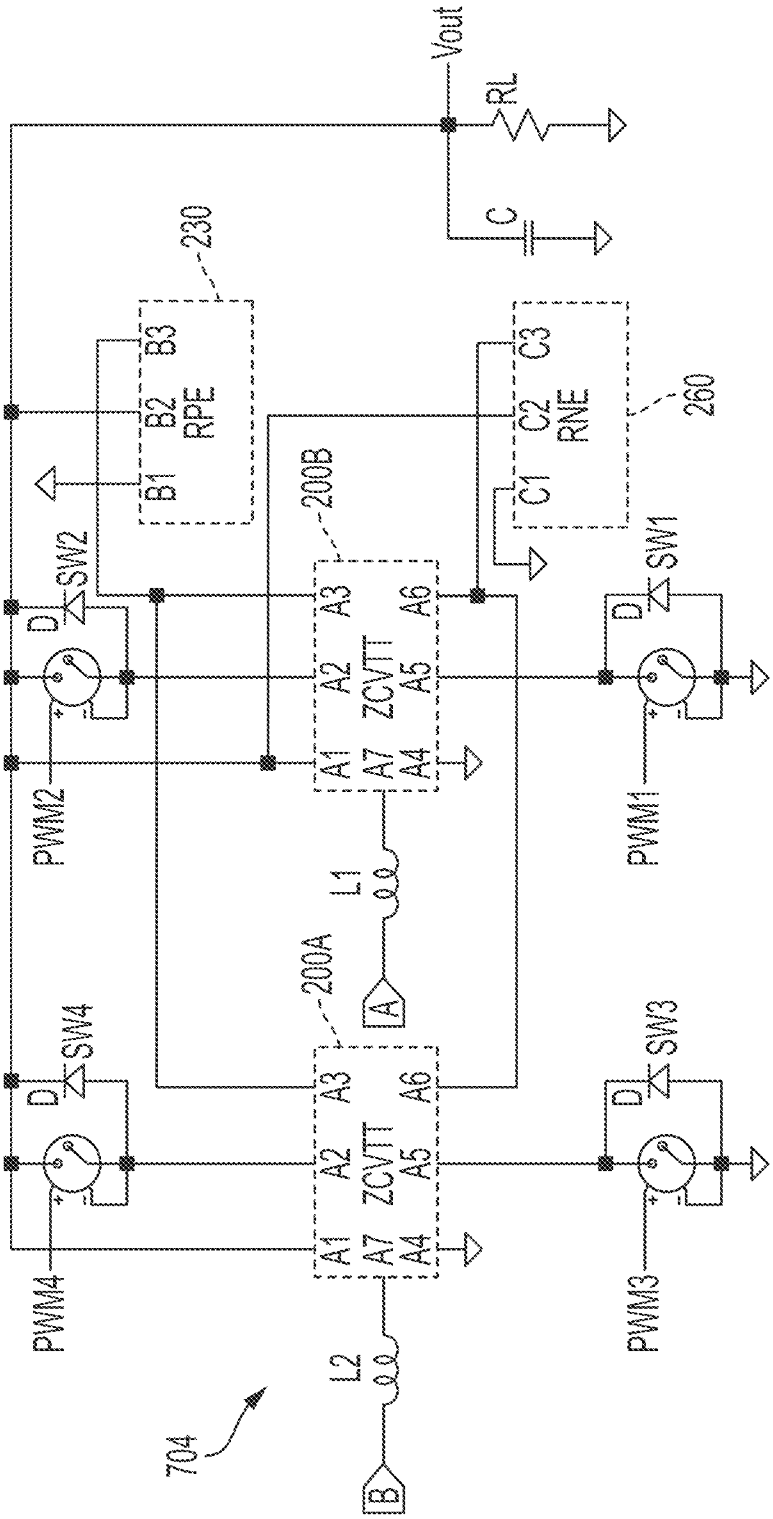
FIG. 7C is a schematic diagram illustrating a circuit layout of a single phase unidirectional synchronous DC-AC inverter with ZCVTT technology included according to some embodiments of the present disclosure.

FIG. 7C illustrates a circuit 704 showing an unidirectional synchronous AC-DC inverter that includes ZCVTT technology. In particular, the circuit 704 includes a first ZCVTT block 200A and a second ZCVTT block 200B, the RPE block 230, and the RNE block 260. As shown, a first switch SW1 is coupled to the terminal A5 of the second ZCVTT block 200B, a second switch SW2 is coupled to the terminal A2 of the second ZCVTT block 200B, a third switch SW3 is coupled to the terminal A5 of the first ZCVTT block 200A, and a fourth switch SW4 is coupled to the terminal A2 of the first ZCVTT block 200A. The ZCVTT blocks 200A, 200B are each coupled to the RPE block 230, the RNE block 260, and the output line Vout. The first ZCVTT block 200A is coupled to the input B and the second ZCVTT block 200B is coupled to the input A. The RPE block 230 and RNE block 260 are also coupled to the output Vout. In order to implement the ZCTT technology in the DC-AC inverter, the circuit 201 of FIG. 2 may be altered by removing the circuit elements in the ZVS1 block and the ZVS2 block, and bypassing LS1 . . . .

Figure 7D:
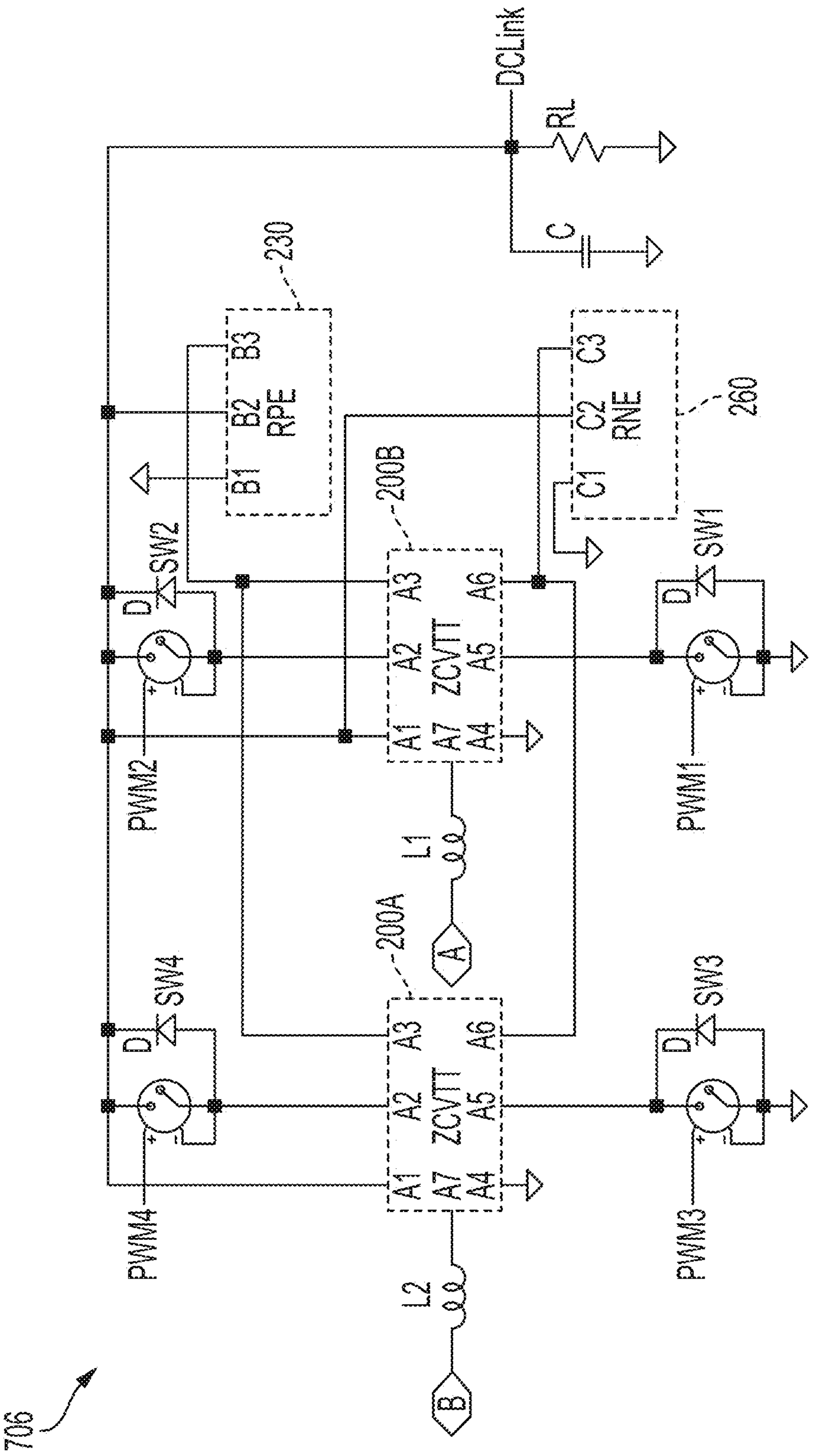
FIG. 7D is a schematic diagram illustrating a circuit layout of a single-phase bidirectional synchronous AC-DC converter and DC-AC inverter with ZCVTT technology included according to some embodiments of the present disclosure.

FIG. 7D illustrates a circuit 706 showing a bidirectional synchronous AC-DC and DC/AC inverter that includes ZCVTT technology. In particular, the circuit 706 includes a first ZCVTT block 200A and a second ZCVTT block 200B, the RPE block 230, and the RNE block 260. As shown, a first switch SW1 is coupled to the terminal A5 of the second ZCVTT block 200B, a second switch SW2 is coupled to the terminal A2 of the second ZCVTT block 200B, a third switch SW3 is coupled to the terminal A5 of the first ZCVTT block 200A, and a fourth switch SW4 is coupled to the terminal A2 of the first ZCVTT block 200A. The ZCVTT blocks 200A, 200B are each coupled to the RPE block 230, the RNE block 260, and the output line Vout. The first ZCVTT block 200A is coupled to the input B and the second ZCVTT block 200B is coupled to the input A. The RPE block 230 and RNE block 260 are also coupled to the output Vout. The circuit 706 may function as desired without adjusting any circuit elements of the circuit 201 of FIG. 2. In order to implement the ZCTT technology in the bidirectional synchronous AC-DC converter and DC-AC inverter, the circuit 201 of FIG. 2 may be altered by removing the circuit elements in the ZVS1 block and the ZVS2 block.

Figure 7E:
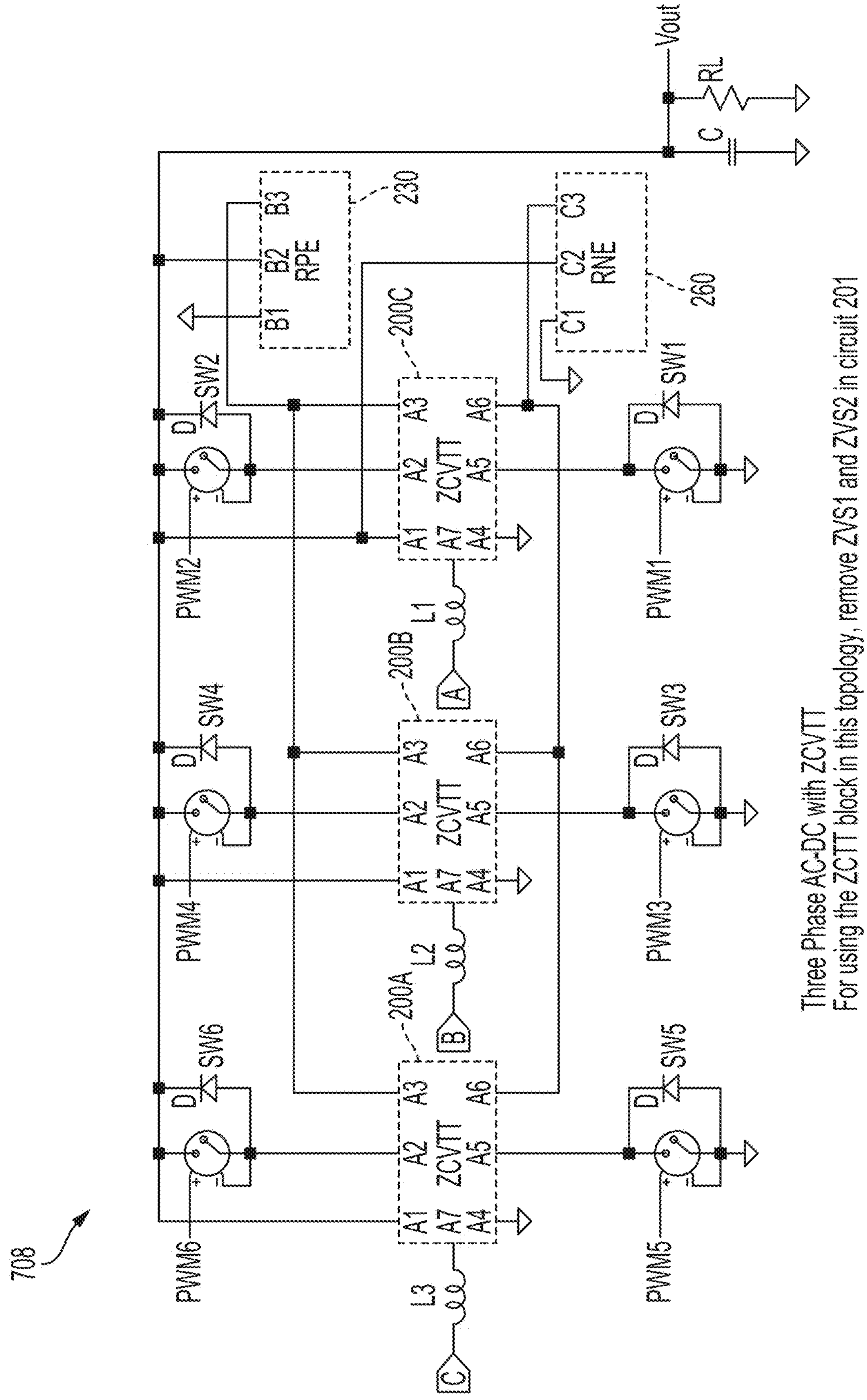
FIG. 7E is a schematic diagram illustrating a circuit layout of a three-phase AC-DC converter with ZCVTT technology included according to some embodiments of the present disclosure.

FIG. 7E illustrates a circuit 708 showing a three-phase AC-DC inverter that includes ZCVTT technology. In particular, the circuit 708 includes a first ZCVTT block 200A, a second ZCVTT block 200B, and a third ZCVTT block 200C, the RPE block 230, and the RNE block 260. As shown, a first switch SW1 is coupled to the terminal A5 of the third ZCVTT block 200C, a second switch SW2 is coupled to the terminal A2 of the third ZCVTT block 200C, a third switch SW3 is coupled to the terminal A5 of the second ZCVTT block 200B, a fourth switch SW4 is coupled to the terminal A2 of the second ZCVTT block 200B, a fifth switch SW5 is coupled to the terminal A5 of the first ZCVTT block 200A, and a sixth switch SW6 is coupled to the terminal A2 of the first ZCVTT block 200A. The ZCVTT blocks 200A, 200B, 200C are each coupled to the RPE block 230, the RNE block 260, and the output line Vout. The first ZCVTT block 200A is coupled to the input C, the second ZCVTT block 200B is coupled to the input B, and the third ZCVTT block 200C is coupled to the input A. The RPE block 230 and RNE block 260 are also coupled to the output Vout. The circuit 708 may function as desired without adjusting any circuit elements of the circuit 201 of FIG. 2. In order to implement the ZCTT technology in the three-phase AC-DC converter, the circuit 201 of FIG. 2 may be altered by removing the circuit elements in the ZVS1 block and the ZVS2 block.

Figure 7F:
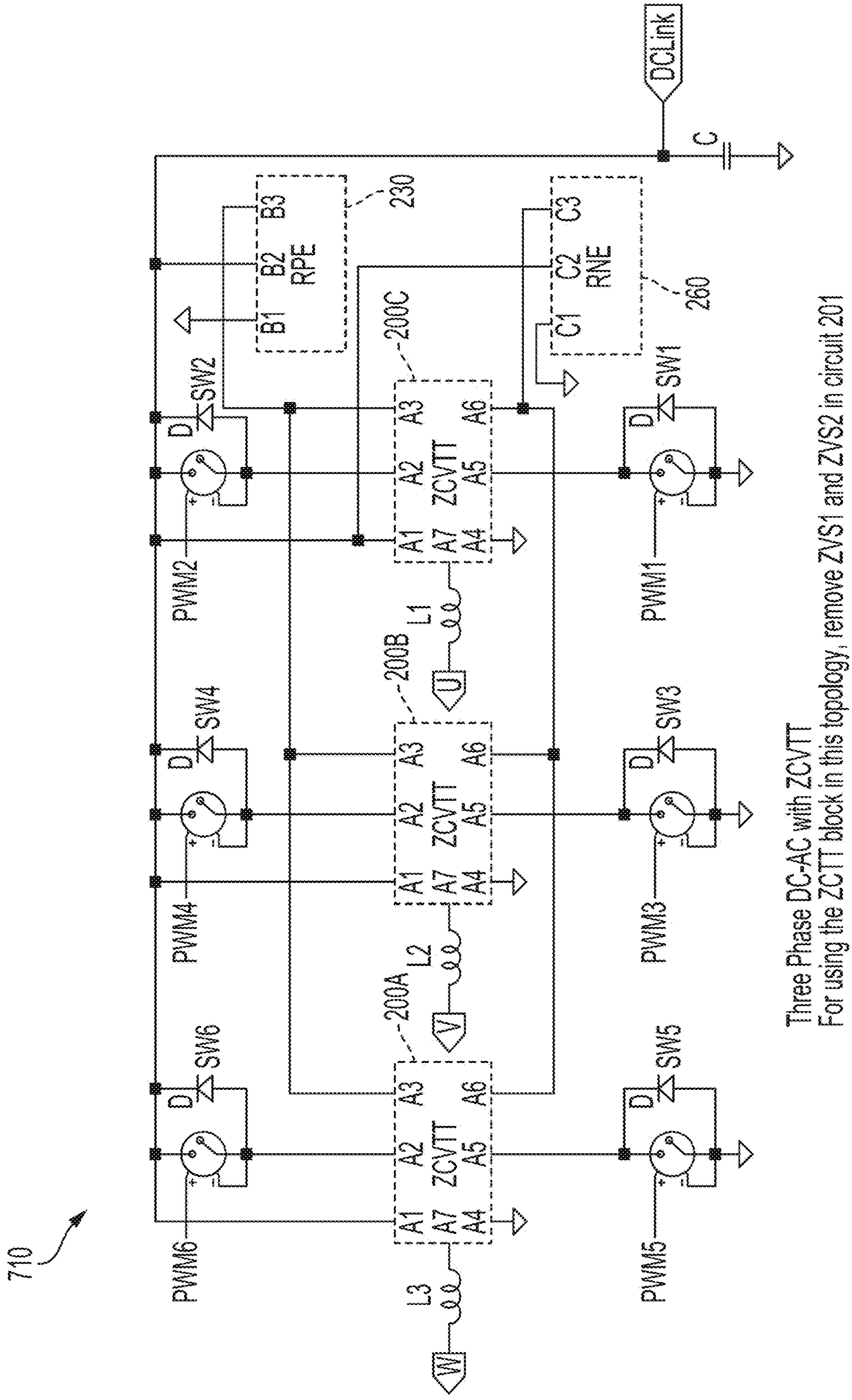
FIG. 7F is a schematic diagram illustrating a circuit layout of a three-phase DC-AC inverter with ZCVTT technology included according to some embodiments of the present disclosure.

FIG. 7F illustrates a circuit 710 showing a three-phase DC-AC inverter that includes ZCVTT technology. In particular, the circuit 710 includes a first ZCVTT block 200A, a second ZCVTT block 200B, and a third ZCVTT block 200C, the RPE block 230, and the RNE block 260. As shown, a first switch SW1 is coupled to the terminal A5 of the third ZCVTT block 200C, a second switch SW2 is coupled to the terminal A2 of the third ZCVTT block 200C, a third switch SW3 is coupled to the terminal A5 of the second ZCVTT block 200B, a fourth switch SW4 is coupled to the terminal A2 of the second ZCVTT block 200B, a fifth switch SW5 is coupled to the terminal A5 of the first ZCVTT block 200A, and a sixth switch SW6 is coupled to the terminal A2 of the first ZCVTT block 200A. The ZCVTT blocks 200A, 200B, 200C are each coupled to the RPE block 230, the RNE block 260, and the output line Vout. The first ZCVTT block 200A is coupled to the input W, the second ZCVTT block 200B is coupled to the input V, and the third ZCVTT block 200C is coupled to the input U. The RPE block 230 and RNE block 260 are also coupled to the output Vout. The circuit 708 may function as desired without adjusting any circuit elements of the circuit 201 of FIG. 2. In order to implement the ZCTT technology in the three-phase DC-AC inverter, the circuit 201 of FIG. 2 may be altered by removing the circuit elements in the ZVS1 block and the ZVS2 block.

Figure 7G:
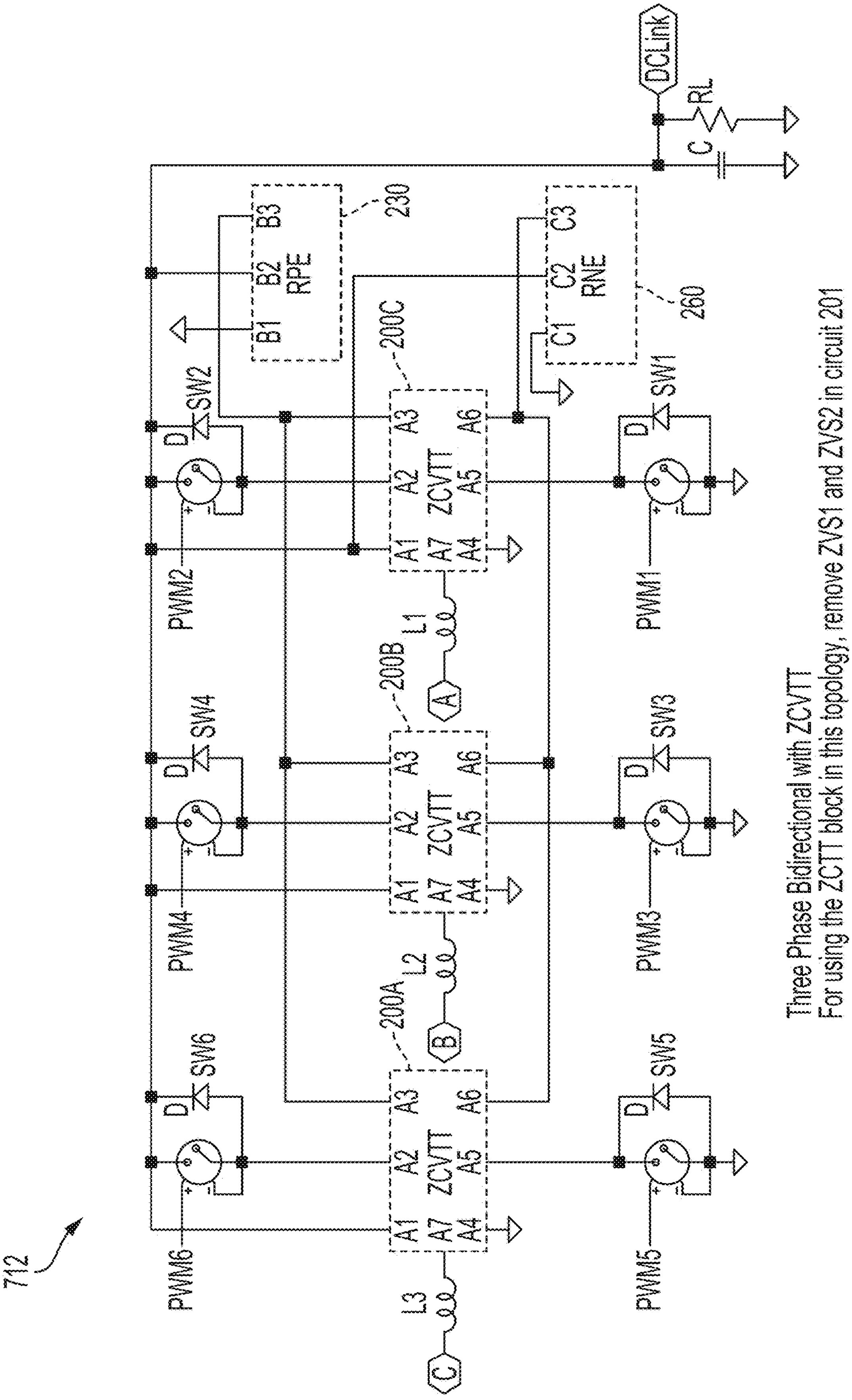
FIG. 7G is a schematic diagram illustrating a circuit layout of a three-phase bidirectional AC-DC converter and DC-AC inverter with ZCVTT technology included according to some embodiments of the present disclosure.

FIG. 7G illustrates a circuit 712 showing a three-phase bidirectional AC-DC and DC-AC inverter that includes ZCVTT technology. In particular, the circuit 712 includes a first ZCVTT block 200A, a second ZCVTT block 200B, and a third ZCVTT block 200C, the RPE block 230, and the RNE block 260. As shown, a first switch SW1 is coupled to the terminal A5 of the third ZCVTT block 200C, a second switch SW2 is coupled to the terminal A2 of the third ZCVTT block 200C, a third switch SW3 is coupled to the terminal A5 of the second ZCVTT block 200B, a fourth switch SW4 is coupled to the terminal A2 of the second ZCVTT block 200B, a fifth switch SW5 is coupled to the terminal A5 of the first ZCVTT block 200A, and a sixth switch SW6 is coupled to the terminal A2 of the first ZCVTT block 200A. The ZCVTT blocks 200A, 200B, 200C are each coupled to the RPE block 230, the RNE block 260, and the output line Vout. The first ZCVTT block 200A is coupled to the input C, the second ZCVTT block 200B is coupled to the input B, and the third ZCVTT block 200C is coupled to the input A. The RPE block 230 and RNE block 260 are also coupled to the output Vout. The circuit 708 may function as desired without adjusting any circuit elements of the circuit 201 of FIG. 2. In order to implement the ZCTT technology in the three-phase bidirectional, the circuit 201 of FIG. 2 may be altered by removing the circuit elements in the ZVS1 block and the ZVS2 block.

Figure 8A:
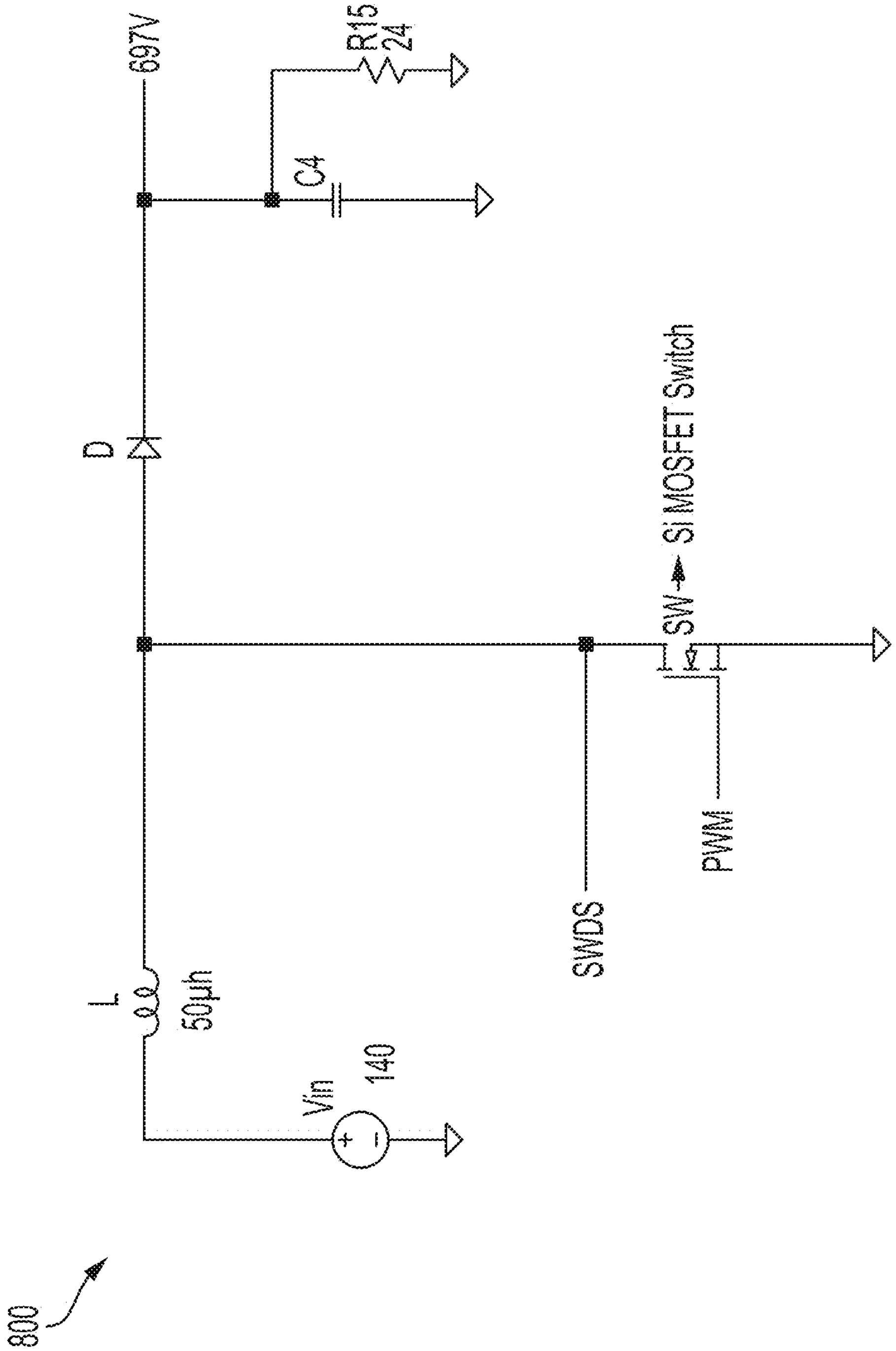
FIG. 8A is a schematic diagram of a conventional boost converter used in simulations according to some embodiments of the present disclosure.
Figure 8B:
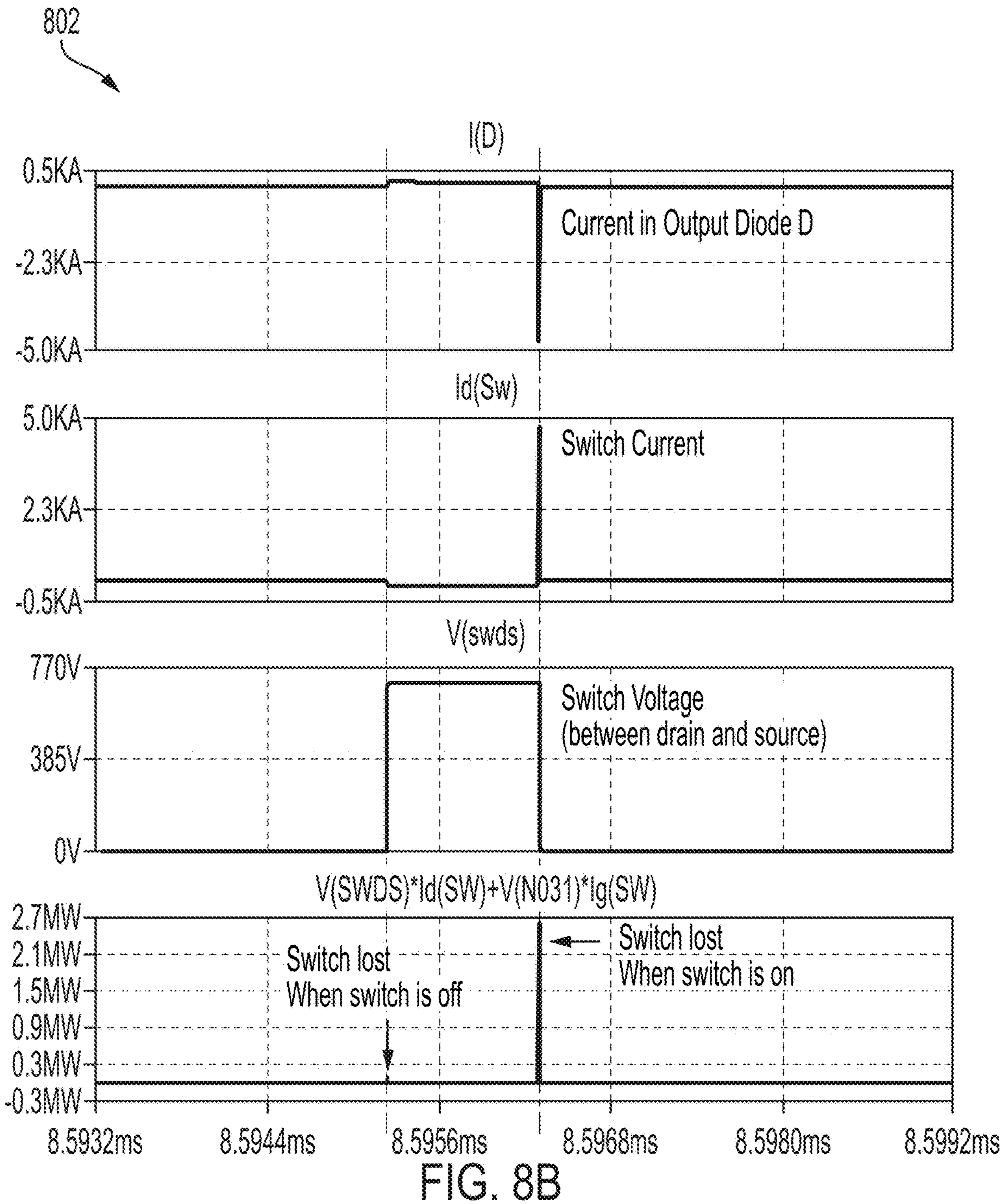
FIG. 8B illustrates the results of a simulation using the boost converter of FIG. 8A according to some embodiments of the present disclosure.

Simulations were performed using SPICE simulator software (LTspice®, available from Analog Devices of Wilmington, Massachusetts) to compare switching circuits that lack ZCVTT technology to similar switching circuits that include ZCVTT technology (i.e., at least one ZCVTT or ZCTT block along with a RPE block and a RNE block). Referring to FIGS. 8A and 8B, a circuit 800 was designed using LTspice® as shown in FIG. 8A. The circuit 800 was designed to be a conventional DC-DC boost converter using a silicon MOSFET switch.

FIG. 8B illustrates results 802 of a simulation using the circuit 800 of FIG. 8A. The results 802 show current (I(D)) flowing through the diode D, current flowing through the MOSFET switch SW (Id(SW)), voltage across the drain and source of switch SW (V(SWDS)), gate source voltage (V(N031)), gate current (Ig(SW)), and the total power loss via the switch (V(SWDS)*Id(SW)+V(N031)*Ig(SW)), all over a set period of time. As shown, some power is lost while the switch SW is turned off, and a significant amount of power is lost when the switch turns on (as evidenced by the spike at approximately 8.5957 milliseconds (ms)). This loss is due to switching loss (the spike) along with conduction loss (when the switch SW is off).

Figure 8C:
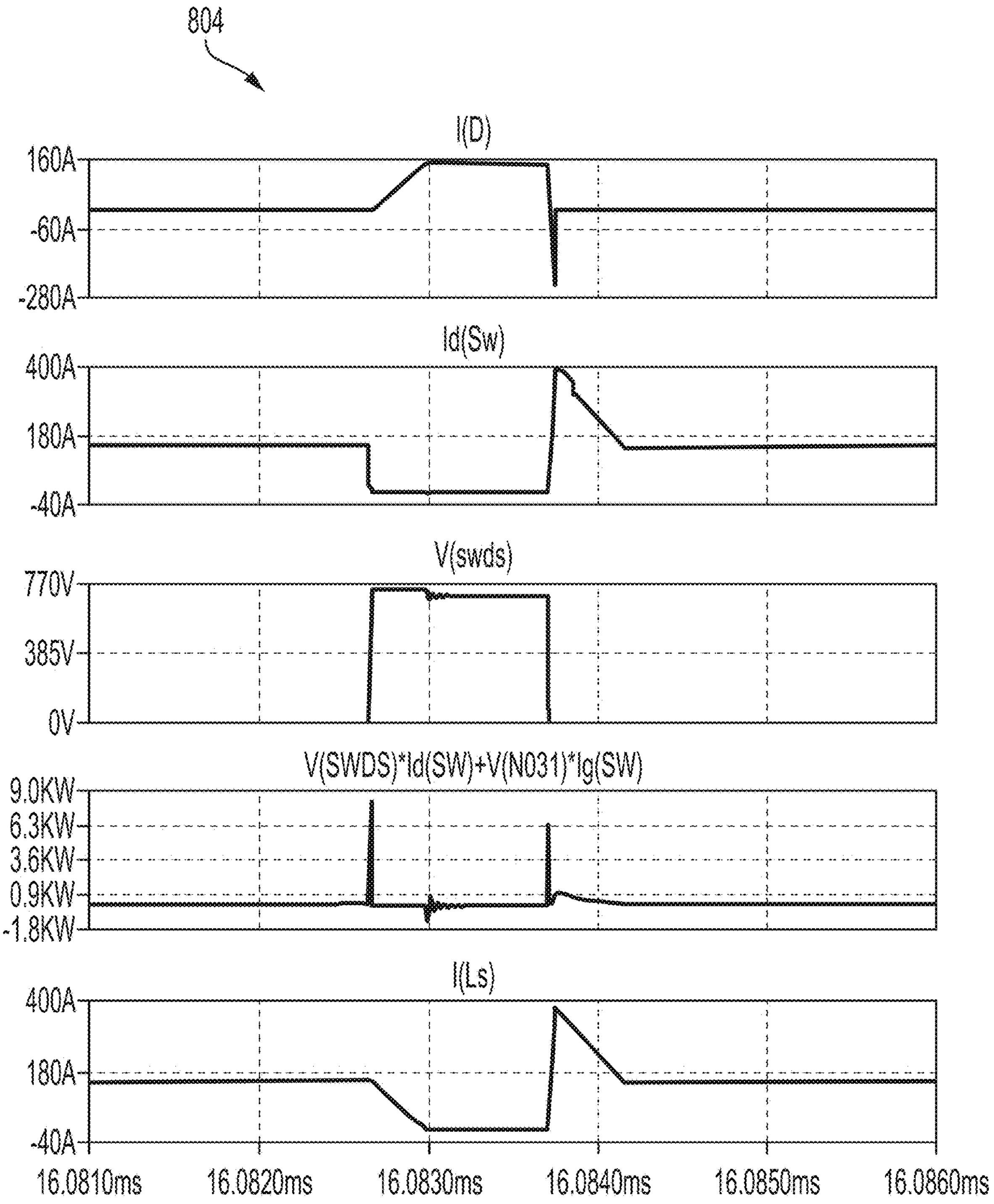
FIG. 8C illustrates the results of a simulation using a boost converter with ZCVTT technology included according to some embodiments of the present disclosure.

Turning now to FIG. 8C, results 804 of a simulation using a boost converter with ZCVTT technology included. The simulation was performed using LTSpice® and with a circuit designed similarly to the circuit 201 of FIG. 2. In that regard, the simulation was performed using ZCTT rather than ZCVTT. The results illustrate current (I(D)) flowing through the diode D, current flowing through the MOSFET switch SW (Id(SW)), voltage across the drain and source of switch SW (Vswds), power loss via the switch (V(SWDS)*Id(SW)+V(N031)*Ig(SW)), and current flowing through the inductor (I(Ls)), all over a set period of time. As shown, a significantly reduced amount of power loss is experienced relative to the results 802 of FIG. 8B as a result of the addition of the ZCVTT blocks. The peak power losses in the conventional boost converter (i.e., without ZCVTT or ZCTT) in switch turn-off and switch turn-on are 90 kW and 2.6 MW, respectively. The peak power losses in the boost converter with ZCVTT in switch turn-off and switch turn-on are 8.5 kW and 6.3 kW, respectively. There is a reduction in power loss of 91% and 99.8% in switch turn-off and switch turn-on, respectively, in the boost converter with ZCVTT relative to the conventional boost converter. The main elements for reducing the power loss spikes are LS1 and LS2 in the ZCS block of FIG. 2, along with the ZVS1 block and the ZVS2 block of FIG. 2.

Figure 8D:
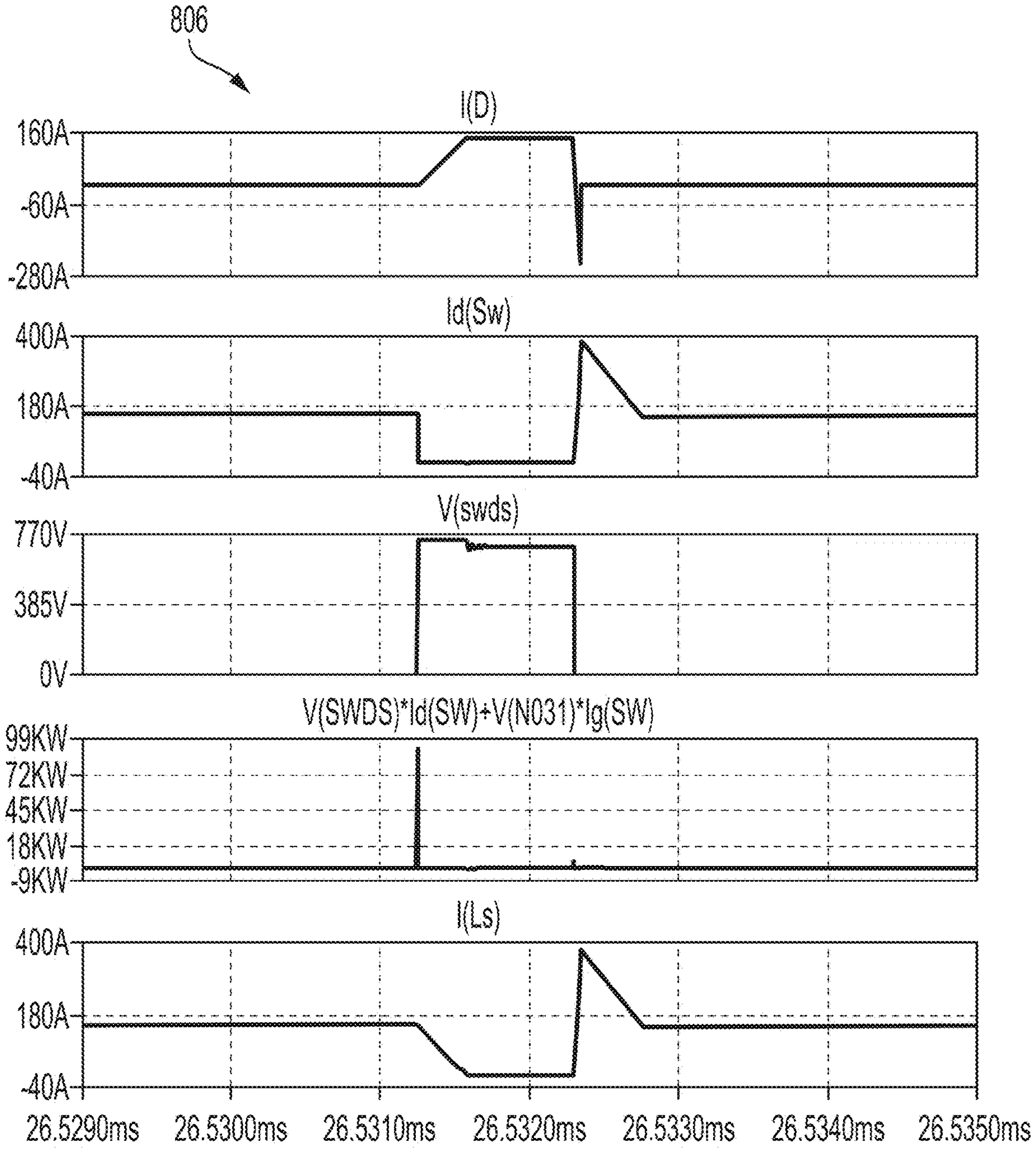
FIG. 8D illustrates the results of a simulation using a boost converter with ZCTT technology included according to some embodiments of the present disclosure.

Referring to FIG. 8D, results 806 of a simulation using a boost converter with ZCTT technology included. The simulation was performed using LTSpice® and with a circuit designed similarly to the circuit 301 of FIG. 3. That is, the ZCVTT block includes a ZCS block without any ZVS blocks. In that regard, the simulation was performed using ZCTT rather than ZCVTT. The results illustrate current (I(D)) flowing through the diode D, current flowing through the MOSFET switch SW (Id(SW)), voltage across the drain and source of switch SW (Vswds), power loss via the switch (V(SWDS)*Id(SW)+V(N031)*Ig(SW)), and current flowing through the inductor (I(Ls)), all over a set period of time. As shown, a significantly reduced amount of power loss is experienced relative to the results 802 of FIG. 8B as a result of the addition of the ZCTT blocks. The peak power losses in the conventional boost converter in switch turn-off and switch turn-on are 90 kW and 2.6 MW, respectively. The peak power losses in the boost converter with ZCTT in switch turn-off and switch turn-on are 90 KW and 6.3 kW, respectively. There is a power loss reduction of 0% and 99.8% in switch turn-off and switch turn-on, respectively, in the boost converter with ZCVTT relative to the conventional boost converter. The main elements for reducing the power loss spike are LS1 and LS2 in the ZCS block of FIG. 2.

Figure 9:
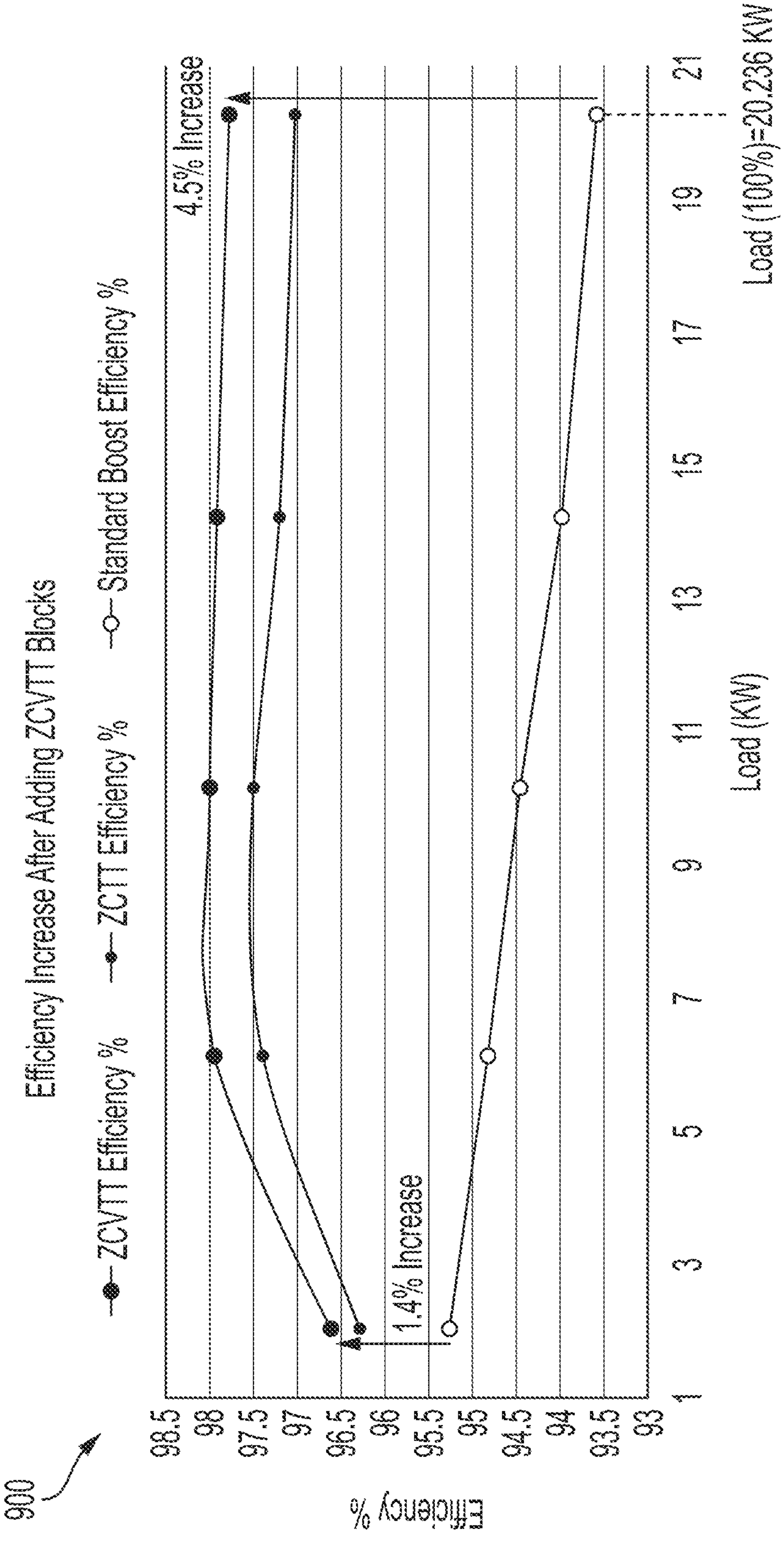
FIG. 9 is a chart illustrating efficiency increases as a result of utilizing ZCTT technology and ZCVTT technology in a boost converter according to some embodiments of the present disclosure.

Turning now to FIG. 9, a chart 900 illustrates an increase of efficiency using the ZCVTT technology and the ZCTT technology. The Y-axis illustrates percent efficiency (Efficiency %), and the X-axis illustrates load applied to the circuit (in Kilowatts (KW). As shown, the efficiency increase at a load of 2 KW is approximately 1.4 percent greater than the conventional boost converter using the ZCVTT blocks, and is slightly greater than the efficiency increase using the ZCTT blocks. However, it can be seen that inclusion of ZCTT technology still provides significantly greater efficiency than the conventional boost converter. The efficiency increase at a greater load (approximately 20 KW) is greater than at 2 KW. Namely, the efficiency increase at 20 KW is approximately 4.5 percent greater than the conventional boost converter using the ZCVTT blocks. Furthermore, the efficiency increase at 20 KW is significantly greater using the ZCTT technology relative to the conventional boost converter.

The ZCVTT and ZCTT technology disclosed herein may be used to increase switching efficiency and reduce loss in multiple switching applications including DC-DC converters, AC-DC converters, and DC-AC converters. Example DC-DC converters in which the ZCVTT and ZCTT may be utilized include non-isolated DC-DC converters including step-up, boost, and down buck converters and AC-DC power supply units (PSU) and DC-DC power distribution systems. Further examples include fuel cells and non-isolated bidirectional DC-DC converters. Additional examples include low-noise block (LNB) downconverters, set-top media boxes (e.g., cable boxes, satellite receivers, etc.), and personal computer (PC) card satellite receivers. Examples also include solar inverters (e.g., at an input and a battery charger) and LED lighting and controls (e.g., in smartphones, keyboard and other accessories, wearable devices, traffic signals, or the like).

Power factor conversion (PFC) processes may be used in many devices. ZCVTT may be implemented to provide advantages in PFC processes which may be used in the input stage of many applications, including single-phase or three-phase uninterruptible power supplies (UPS), switched-mode power supplies (SMPS), heating, ventilation, and air conditioning (HVAC) motor controllers, treadmills, and laser systems. PFC with ZCVTT technology may also be used in major home appliances (e.g., refrigerator, washer, dryer, TV, microwave, and additional miscellaneous equipment), induction cooking surfaces, on-board chargers (OBC) for electric vehicles (EV), DC fast-charging stations, industrial welding equipment, wind turbine power inverters, and protective relay test systems.

ZCVTT or ZCTT may also provide be included in and provide advantages in multiple technologies that include DC-AC converters, including single-phase or three-phase UPS, variable frequency drive (VFD) for AC electric motors (such as in an EV or a hybrid electric vehicle (HEV) as well as industrial applications), DC motor speed control, and class-D amplifiers. Additional DC-AC converters which may benefit from inclusion of ZCVTT or ZCTT include inverters of solar power battery systems, wind turbine power inverters, protective relay test systems, main traction inverter in electric vehicles, and non-isolated 48 volt start-stop systems in vehicles.

As is apparent from reviewing this specification, ZCVTT and ZCTT technology provides significant advantages and may be used in multiple industries for multiple applications. Benefits of ZCVTT and ZCTT technology are manifold and include reduced power loss, increased efficiency, and improved switch performance. Although specific applications and advantages of ZCVTT and ZCTT are disclosed herein, additional applications are considered within the scope of this disclosure, and additional benefits may be realized by utilizing the technology disclosed herein.

Where used throughout the specification and the claims, “at least one of A or B” includes “A” only, “B” only, or “A and B.” Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The invention claimed is:

1. A switching circuit comprising:

a first switch and a second switch;

a passive block coupled to the first switch and the second switch and configured to damp an input signal from the first switch and the second switch;

a voltage line coupled to an output line;

a recycle positive energy (RPE) block coupled to the passive block and configured to recycle positive energy from a positive spike from the passive block; and a recycle negative energy (RNE) block coupled to the passive block and configured to recycle negative energy from a negative spike from the passive block, wherein the passive block includes:

a first terminal coupled to the first switch, a second terminal coupled to the second switch, a third terminal coupled to the RPE block, a fourth terminal coupled to the RNE block, and a fifth terminal coupled to an input voltage; and wherein each of the RPE block and the RNE block include an input terminal coupled to the passive block, a ground terminal coupled to an electrical ground, and an output terminal coupled to the voltage line such that the recycled positive energy and the recycled negative energy are provided to the output line via the voltage line.

2. The switching circuit of claim 1, wherein the passive block is a zero current and voltage transition technique (ZCVTT) block and includes a zero current switching block, a first zero voltage switching block, and a second zero voltage switching block.

3. The switching circuit of claim 1, wherein the passive block is a zero current transition technique (ZCTT) block and includes only a zero current switching block.

4. The switching circuit of claim 1, wherein the passive block includes:

a sixth terminal coupled to the voltage line; and a seventh terminal coupled to an electrical ground.

5. The switching circuit of claim 1, wherein the RPE block and the RNE block each include a pulse width modulator (PWM) coupled between the input terminal and the output terminal, respectively.

6. The switching circuit of claim 1, wherein the RPE block and the RNE block are each active blocks containing both active circuit elements and passive circuit elements.

7. The switching circuit of claim 1, further comprising a second passive block coupled to the second switch and configured to damp a second input signal from the second switch, wherein the RPE block is coupled to the first passive block and to the second passive block and configured to recycle positive energy from the first passive block and from the second passive block, and the RNE block is coupled to the first passive block and to the second passive block and configured to recycle negative energy from the first passive block and from the second passive block.

8. The switching circuit of claim 1, wherein the passive block, the RPE block, and the RNE block are configured to be used with a direct current (DC) to DC converter, an alternating current (AC) to DC converter, and a DC to AC inverter.

9. A circuit for increasing efficiency of a switching system that includes a first switch and a second switch, the circuit comprising:

a passive block coupled to the first switch and the second switch and configured to damp an input signal from the first switch and the second switch;

a voltage line coupled to an output line;

a recycle positive energy (RPE) block coupled to the passive block and configured to recycle positive energy from a positive spike from the passive block; and a recycle negative energy (RNE) block coupled to the passive block and configured to recycle negative energy from a negative spike from the passive block, wherein the passive block includes:

a first terminal coupled to the first switch, a second terminal coupled to the second switch, a third terminal coupled to the RPE block, a fourth terminal coupled to the RNE block, and a fifth terminal coupled to an input voltage; and wherein each of the RPE block and the RNE block include an input terminal coupled to the passive block, a ground terminal coupled to an electrical ground, and an output terminal coupled to the voltage line such that the recycled positive energy and the recycled negative energy are provided to the output line via the voltage line.

10. The switching circuit of claim 9, wherein the passive block is a zero current and voltage transition technique (ZCVTT) block and includes a zero current switching block, a first zero voltage switching block, and a second zero voltage switching block.

11. The switching circuit of claim 9, wherein the passive block is a zero current transition technique (ZCTT) block and includes only a zero current switching block.

12. The switching circuit of claim 9, wherein the passive block includes:

a sixth terminal coupled to the voltage line; and a seventh terminal coupled to an electrical ground.

13. The switching circuit of claim 9, wherein the RPE block and the RNE block each include a pulse width modulator (PWM) coupled between the input terminal and the output terminal, respectively.

14. The switching circuit of claim 9, wherein the RPE block and the RNE block are each active blocks containing both active circuit elements and passive circuit elements.

15. The switching circuit of claim 9, further comprising a second passive block coupled to the second switch and configured to damp a second input signal from the second switch, wherein the RPE block is coupled to the first passive block and to the second passive block and configured to recycle positive energy from the first passive block and from the second passive block, and the RNE block is coupled to the first passive block and to the second passive block and configured to recycle negative energy from the first passive block and from the second passive block.

16. The switching circuit of claim 9, wherein the passive block, the RPE block, and the RNE block are configured to be used with a direct current (DC) to DC converter, an alternating current (AC) to DC converter, and a DC to AC inverter.

17. A switching circuit comprising:

a first switch and a second switch;

a passive block coupled to the first switch and the second switch in a series configuration and configured to damp an input signal from the first switch and the second switch;

a voltage line coupled to an output line;

a recycle positive energy (RPE) block coupled to the passive block and configured to recycle positive energy from a positive spike from the passive block; and a recycle negative energy (RNE) block coupled to the passive block and configured to recycle negative energy from a negative spike from the passive block, wherein the passive block includes:

a first terminal coupled to the first switch, a second terminal coupled to the second switch, a third terminal coupled to the RPE block, a fourth terminal coupled to the RNE block, and a fifth terminal coupled to an input voltage; and wherein each of the RPE block and the RNE block include an input terminal coupled to the passive block, a ground terminal coupled to an electrical ground, and an output terminal coupled to the voltage line such that the recycled positive energy and the recycled negative energy are provided to the output line via the voltage line.

18. The switching circuit of claim 17, wherein the RPE block and the RNE block each include a pulse width modulator (PWM) coupled between the input terminal and the output terminal, respectively.

* * * * *